United States Patent
Katsumata et al.

(10) Patent No.: US 6,477,993 B1
(45) Date of Patent: Nov. 12, 2002

(54) CONTROL DEVICE FOR SOLENOID DRIVING VALVE

(75) Inventors: Shoji Katsumata, Gotenba; Toshio Fuwa, Nagoya; Keiji Yoeda, Numazu; Isao Matsumoto, Susono; Takashi Izuo, Toyota; Tatsuo Iida, Toyota; Hiroyuki Hattori, Toyota; Masahiko Asano, Toyota; Yoshinori Kadowaki, Toyota; Akihiro Yanai, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/600,086
(22) PCT Filed: Jan. 8, 1999
(86) PCT No.: PCT/JP99/00038
  § 371 (c)(1),
  (2), (4) Date: Aug. 23, 2000
(87) PCT Pub. No.: WO99/35375
  PCT Pub. Date: Jul. 15, 1999

(30) Foreign Application Priority Data

Jan. 12, 1998 (JP) .......................................... 10-003972
Mar. 4, 1998 (JP) .......................................... 10-052356

(51) Int. Cl.⁷ ................................................. F01L 9/04
(52) U.S. Cl. ................................. 123/90.11; 251/129.01
(58) Field of Search ...... 123/90.11; 251/129.01–129.22

(56) References Cited

U.S. PATENT DOCUMENTS

| 6,073,596 A | * | 6/2000 | Kemper | 123/90.11 |
| 6,076,490 A | * | 6/2000 | Esch et al. | 123/90.11 |
| 6,182,620 B1 | * | 2/2001 | Cristiani et al. | 123/90.11 |
| 6,213,068 B1 | * | 4/2001 | Hassdenteufel | 123/90.11 |
| 6,263,857 B1 | * | 7/2001 | Obata et al. | 123/90.11 |
| 6,276,316 B1 | * | 8/2001 | Arai et al. | 123/90.11 |

* cited by examiner

Primary Examiner—John Kwon
(74) Attorney, Agent, or Firm—Kenyon & Kenyon

(57) ABSTRACT

The invention relates to a control apparatus for controlling a solenoid valve that functions to displace one of an intake valve or an exhaust valve of an internal combustion engine. The object of the invention is to adjust, when a valve element connected to the solenoid valve is displaced between a valve-open position and a valve-closed position, the magnitude of an electromagnetic force displacing the valve element, to a controlled value based on a pressure acting on the valve element. The solenoid valve displaces the valve element (40) by a cooperation of resilient forces of an upper spring (104) and a lower spring (106) and electromagnetic forces of an upper coil (98) and a lower coil (100). In the control apparatus, a pressure acting on the valve element (40) is detected directly or indirectly. When the valve element is displaced from one of the valve-open position and the valve-closed position to the other position, the magnitude of an electromagnetic force to displace the valve element (40) to the other position is adjusted to a controlled value based on the valve-element pressure detected.

4 Claims, 20 Drawing Sheets

CONTROL DEVICE FOR SOLENOID DRIVING VALVE

BACKGROUND OF THE INVENTION

1. Field of the Invention

The present invention generally relates to a solenoid valve control apparatus, and more particularly to a control apparatus for controlling a solenoid valve that functions to displace one of an intake valve or an exhaust valve of an internal combustion engine.

2. Description of the Related Art

As disclosed in Japanese Laid-Open Patent Application No.7-335437, a conventional solenoid valve that serves to displace one of an intake valve or an exhaust valve of an internal combustion engine is known. The intake valve or the exhaust valve is provided with a valve element, which is displaced between a valve-open position and a valve-closed position in order to open or close a passage between the engine port and the combustion chamber. The solenoid valve controls the movement of the valve element by a cooperation of a resilient force of an elastic member and an electromagnetic force of a solenoid coil. By electrically controlling the solenoid valve, it is possible to set the passage between the engine port and the combustion chamber in the open condition or the closed condition.

However, it should be noted that an internal pressure of the engine cylinder and a pressure of the engine port are exerted on the valve element of the intake valve or the exhaust valve. The engine cylinder pressure functions to displace the valve element in a valve-closing direction toward the valve-closed position, and the engine port pressure functions to displace the valve element in the opposite direction toward the valve-open position. As the engine cylinder pressure and the engine port pressure often fluctuate during operation of the engine, the electromagnetic force needed to displace the valve element from the valve-closed position to the valve-open position and the electromagnetic force needed to displace the valve element from the valve-open position to the valve-closed position considerably change.

In order to properly operate the solenoid valve with low power consumption, it is desirable to control the magnitude of the electromagnetic force to displace the valve element from the valve-closed position to the vale-open position or vice versa, so as to make it as small as possible. In order to properly operate the solenoid valve with a reliable smooth valve element operation even if the engine cylinder pressure and the engine port pressure on the valve element of the intake valve or the exhaust valve fluctuate, it is necessary to properly adjust the magnitude of the electromagnetic force to displace the valve element in the valve-opening direction or in the opposite valve-closing direction, in accordance with the engine cylinder/port pressure acting on the valve element.

However, in the above-mentioned solenoid valve, the influences of the valve-element pressure onto the electromagnetic force to displace the valve element are not at all taken into consideration. It is difficult for the above-mentioned solenoid valve to adjust the to displace the valve element between the valve-open position and the valve-closed position with low power consumption when the engine cylinder/port pressure acting on the valve element considerably fluctuates.

SUMMARY OF THE INVENTION

An object of the present invention is to provide an improved solenoid valve control apparatus in which the above-described problems are eliminated.

Another object of the present invention is to provide a solenoid valve control apparatus that properly adjusts the magnitude of an electromagnetic force to displace the valve element from one of the valve-open position and the valve-closed position to the other position, to a controlled value based on the pressure acting on the valve element.

In order to achieve the above-mentioned objects, one preferred embodiment of the present invention provides a solenoid valve control apparatus which controls a solenoid valve, the solenoid valve displacing a valve element between a valve-open position and a valve-closed position by a cooperation of a resilient force of an elastic member and an electromagnetic force of a solenoid coil, the solenoid valve control apparatus including: a pressure detection means for directly or indirectly detecting a pressure acting on the valve element; and an electromagnetic force adjustment means for adjusting, when the valve element is displaced from one of the valve-open position and the valve-closed position to the other position, the magnitude of an electromagnetic force to displace the valve element to the other position, to a controlled value based on the valve-element pressure detected by the pressure detection means.

In the solenoid valve control apparatus of the above preferred embodiment of the invention, the electromagnetic force to displace the valve element from one of the valve-open position and the valve-closed position to the other position is properly adjusted to the controlled value based on the valve-element pressure. The electromagnetic force is not significantly influenced even if the valve-element pressure changes due to the fluctuations of the operating conditions of the engine. The solenoid valve control apparatus of the above preferred embodiment is effective in properly adjusting the magnitude of the electromagnetic force to the controlled value based on the valve-element pressure. The solenoid valve control apparatus of the above preferred embodiment can provide the least possible electromagnetic force that is needed to displace the valve element. It is possible to properly operate the solenoid valve with low power consumption and with a reliable smooth valve element operation.

In order to achieve the above-mentioned objects, one preferred embodiment of the present invention provides the solenoid valve control apparatus in which the pressure detection means includes cylinder pressure detection means for detecting an internal pressure of a cylinder of an internal combustion engine, and the pressure detection means detects the valve-element pressure based on the internal pressure of the engine cylinder.

In the solenoid valve control apparatus of the above preferred embodiment, the valve-element pressure is detected based on the internal pressure of the engine cylinder. The solenoid valve control apparatus of this embodiment can directly detect the valve-element pressure with high accuracy.

In order to achieve the above-mentioned objects, one preferred embodiment of the present invention provides the solenoid valve control apparatus wherein the pressure detection means further includes port pressure detection means for directly or indirectly detecting a port pressure of the engine, and the pressure detection means detects the valve-element pressure based on a difference between the engine cylinder pressure and the engine port pressure.

In the solenoid valve control apparatus of the above preferred embodiment, the valve-element pressure is detected based on the difference between the engine cylinder pressure and the engine port pressure. The solenoid valve control apparatus of this embodiment can detect the valve-element pressure with high accuracy. The engine port pressure can be directly detected by using a port pressure sensor that senses a port pressure of the engine, or can be indirectly detected through a mapping from the engine speed to the engine port pressure.

In order to achieve the above-mentioned objects, one preferred embodiment of the present invention provides the solenoid valve control apparatus wherein the pressure detection means includes elastic-member strain detection means for detecting an amount of strain of the elastic member when a predetermined period has elapsed after a start of the displacement of the valve element, and the pressure detection means detects the valve-element pressure based on the amount of strain of the elastic member.

In the solenoid valve control apparatus of the above preferred embodiment, the valve-element pressure is detected based on the amount of strain of the elastic member. The correlation between the amount of strain of the elastic member and the pressure acting on the valve element is utilized to detect the valve-element pressure, and the solenoid valve control apparatus of this embodiment can detect the valve-element pressure with high accuracy.

In order to achieve the above-mentioned objects, one preferred embodiment of the present invention provides the solenoid valve control apparatus wherein the pressure detection means includes elastic-member length detection means for detecting a whole length of the elastic member when a predetermined period has elapsed after a start of the displacement of the valve element, and the pressure detection means detects the valve-element pressure based on the whole length of the elastic member.

In the solenoid valve control apparatus of the above preferred embodiment, the valve-element pressure is detected based on the whole length of the elastic member. The correlation between the whole length of the elastic member and the pressure acting on the valve element is utilized to detect the valve-element pressure, and the solenoid valve control apparatus of this embodiment can detect the valve-element pressure with high accuracy.

In order to achieve the above-mentioned objects, one preferred embodiment of the present invention provides the solenoid valve control apparatus wherein the pressure detection means includes load detection means for detecting a load of an internal combustion engine, and the pressure detection means detects the valve-element pressure based on the engine load.

In the solenoid valve control apparatus of the above preferred embodiment, the valve-element pressure is detected based on the engine load. The engine load correlates with the engine cylinder pressure. The solenoid valve control apparatus of this embodiment can detect or estimate the valve-element pressure with high accuracy by utilizing the correlation between the engine load and the engine cylinder pressure. The engine load can be detected based on a vacuum pressure of the intake pipe of the engine, an amount of air taken in the engine, and a position of the throttle valve of the engine.

In order to achieve the above-mentioned objects, one preferred embodiment of the present invention provides the solenoid valve control apparatus wherein the pressure detection means further includes port pressure detection means for directly or indirectly detecting a port pressure of the engine, and the pressure detection means detects the valve-element pressure based on the engine load and the engine port pressure.

In the solenoid valve control apparatus of the above preferred embodiment, the valve-element pressure is detected based on the engine load and the engine port pressure. The solenoid valve control apparatus of this embodiment can detect the valve-element pressure with high accuracy. The engine port pressure can be directly detected by using a port pressure sensor that senses a port pressure of the engine, or can be indirectly detected through a mapping from the engine speed to the engine port pressure.

In order to achieve the above-mentioned objects, one preferred embodiment of the present invention provides the solenoid valve control apparatus which further includes transient-condition detection means for detecting a transient condition of the engine in which a transient change of the engine load occurs, wherein the electromagnetic force adjustment means adjusts, when the transient condition is detected, the magnitude of the electromagnetic force to a controlled value which is compensated for the change of the engine load.

The solenoid valve control apparatus of the above preferred embodiment is effective in properly adjusting the magnitude of the electromagnetic force to a controlled value based on the valve-element pressure even when the transient condition of the engine exists. When the vehicle operator intends to abruptly accelerate or decelerate the vehicle, there will exist the transient condition of the engine in which the engine load quickly changes. In this transient condition, the engine load may quickly change prior to the adjustment of the electromagnetic force based on the valve-element pressure. In the solenoid valve control apparatus of this embodiment, when the transient condition is detected, the magnitude of the electromagnetic force is adjusted to a controlled value which is compensated for the change of the engine load.

In order to achieve the above-mentioned objects, one preferred embodiment of the present invention provides the solenoid valve control apparatus wherein the pressure detection means includes high-pressure condition detection means for detecting a high-pressure condition in which the valve-element pressure is larger than a predetermined high pressure, and the electromagnetic force adjustment means adjusts, when the high-pressure condition is detected, the magnitude of the electromagnetic force to displace the valve element to the other position, to a controlled value based on the predetermined high pressure.

In the solenoid valve control apparatus of the above preferred embodiment, when the high-pressure condition is detected, the magnitude of the electromagnetic force to displace the valve element to the other position, is adjusted to a controlled value based on the predetermined high pressure. At a start of the operation of the internal combustion engine, a very high pressure is likely to act on the valve element. Even when the high-pressure condition exists, the solenoid valve control apparatus of this embodiment can provide a reliable, smooth valve element operation.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be provided of preferred embodiments of the present invention with reference to the accompanying drawings.

Figure 1:
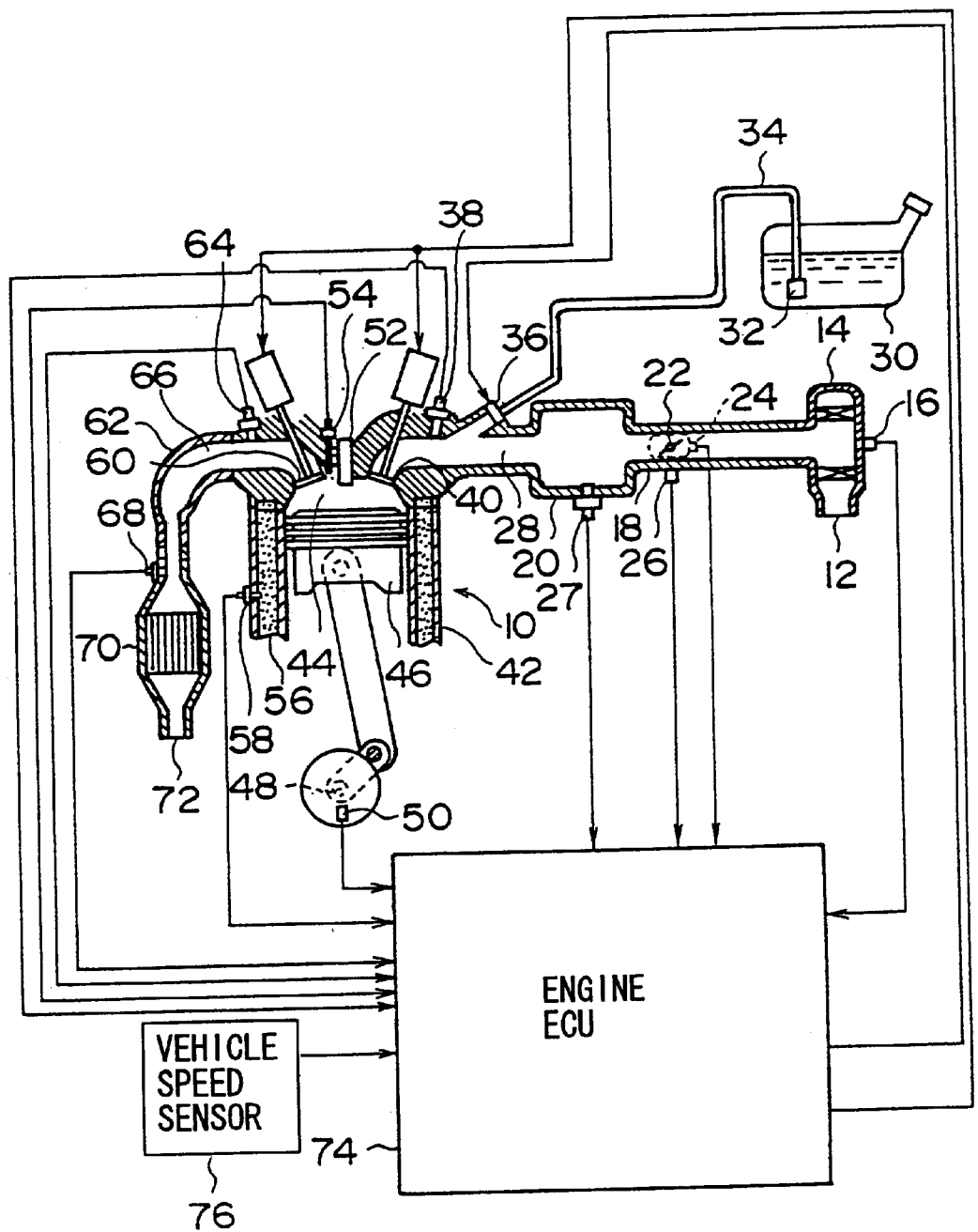
FIG. 1 is a diagram showing an internal combustion engine to which one preferred embodiment of the solenoid valve control apparatus of the invention is applied.

FIG. 1 shows an internal combustion engine 10 to which one preferred embodiment of the solenoid valve control apparatus of the invention is applied.

The internal combustion engine 10 is provided with an inlet opening 12. An air cleaner 14 is provided in the inside of the inlet opening 12. An inlet air temperature sensor 16 is provided in the vicinity of the inlet opening 12. The inlet air temperature sensor 16 outputs an electric signal indicative of a temperature of air that is taken in by the engine 10.

A throttle body 18 is connected to the inlet opening 12. A serge tank 20 is connected through the throttle body 18 to the inlet opening 12. A throttle valve 22 is provided in the inside of the throttle body 18. A throttle sensor 24 and an idle switch 26 are secured to the throttle body 18. The throttle sensor 24 outputs an electrical signal indicative of a valve-open position of the throttle valve 22. The idle switch 26 outputs an ON signal when the throttle valve 22 is set in the fully closed position.

An intake pressure sensor 27 is provided in the serge tank 20. The intake pressure sensor 27 outputs an electrical signal indicative of an internal air pressure of the serge tank 20. An intake port 28 of each of the cylinders of the engine is connected to the serge tank 20. The air that flows into the serge tank 20 is supplied through the intake port 28 of each of the cylinders to the engine 10.

Further, the internal combustion engine 10 is provided with a fuel tank 30. A fuel pump 32 is provided in the fuel tank 30. The fuel, contained in the fuel tank 30, is delivered under pressure through a fuel pipe 34 by the fuel pump 32. The fuel pipe 34 is connected to a fuel injection valve 36. The fuel injection valve 36 is secured to the intake port 28 of each of the cylinders of the engine. The fuel, delivered through the fuel pipe 34, is injected to the intake port 28 by the fuel injection valve 36 when the fuel injection valve 36 is set in the valve-open position. An intake port pressure sensor 38 is secured to the intake port 28. The intake port pressure sensor 38 outputs an electrical signal indicative of a pressure of the air-fuel mixture within the intake port 28.

Further, the internal combustion engine 10 is provided with a cylinder block 42. A combustion chamber 44 is formed in the inside of the cylinder block 42. The combustion chamber 44 is connected through an intake valve 40 to the intake port 28. The intake valve 40 includes a valve element that is displaced between a valve-open position and a valve-closed position in order to open or close the communicating passage between the intake port 28 and the combustion chamber 44.

Further, the internal combustion chamber 10 is provided with a piston 46. A crankshaft 48 is linked to the piston 46. The crankshaft 48 is rotated around its center axis by the piston 46 when the piston 46 moves up and down within the cylinder 42. A crank angle sensor 50 is secured to the crankshaft 48. The crank angle sensor 50 outputs a pulsed signal each time the crankshaft 48 is rotated around the center axis by a given rotation angle.

A spark plug 52 is secured to the combustion chamber 44. The air-fuel mixture that enters the combustion chamber 44 is sparked by the spark plug 52. A cylinder pressure sensor 54 is secured to the combustion chamber 44. The cylinder pressure sensor 54 outputs an electrical signal indicative of an internal pressure of the combustion chamber 44.

A cooling water passage 56 is provided in the cylinder block 42 such that the combustion chamber 44 is surrounded by the cooling water passage 56. A water temperature sensor 58 is secured to the cooling water passage 56. The water temperature sensor 58 outputs an electrical signal indicative of a temperature of the cooling water that is introduced into the cooling water passage 56.

An exhaust manifold 62 is provided in the combustion chamber 44. The combustion chamber 44 is connected through an exhaust valve 60 to the exhaust manifold 62. An exhaust port 66 is formed in the exhaust manifold 62. Similar to the intake valve 40, the exhaust valve 60 includes a valve element that is displaced between a valve-open position and a valve-closed position in order to open or close the communicating passage between the exhaust port 66 and the combustion chamber 44.

An exhaust port pressure sensor 64 is secured to the exhaust manifold 62. The exhaust port pressure sensor 64 outputs an electrical signal indicative of a pressure of the exhaust gas within the exhaust manifold 62. Further, an oxygen sensor 68 is secured to the exhaust manifold 62. The oxygen sensor 68 outputs an electrical signal indicative of a concentration of oxygen gas in the exhaust gas delivered through the exhaust manifold 62. Further, a catalytic converter 70 is provided at a downstream portion of the exhaust manifold 62. The catalytic converter 70 serves to clean up the exhaust gas that is delivered from the engine 10 to the exhaust manifold 62. The cleaned-up exhaust gas is delivered from the catalytic converter 70 to an exhaust outlet 72, and it is sent from the exhaust outlet 72 to the atmosphere.

Figure 2:
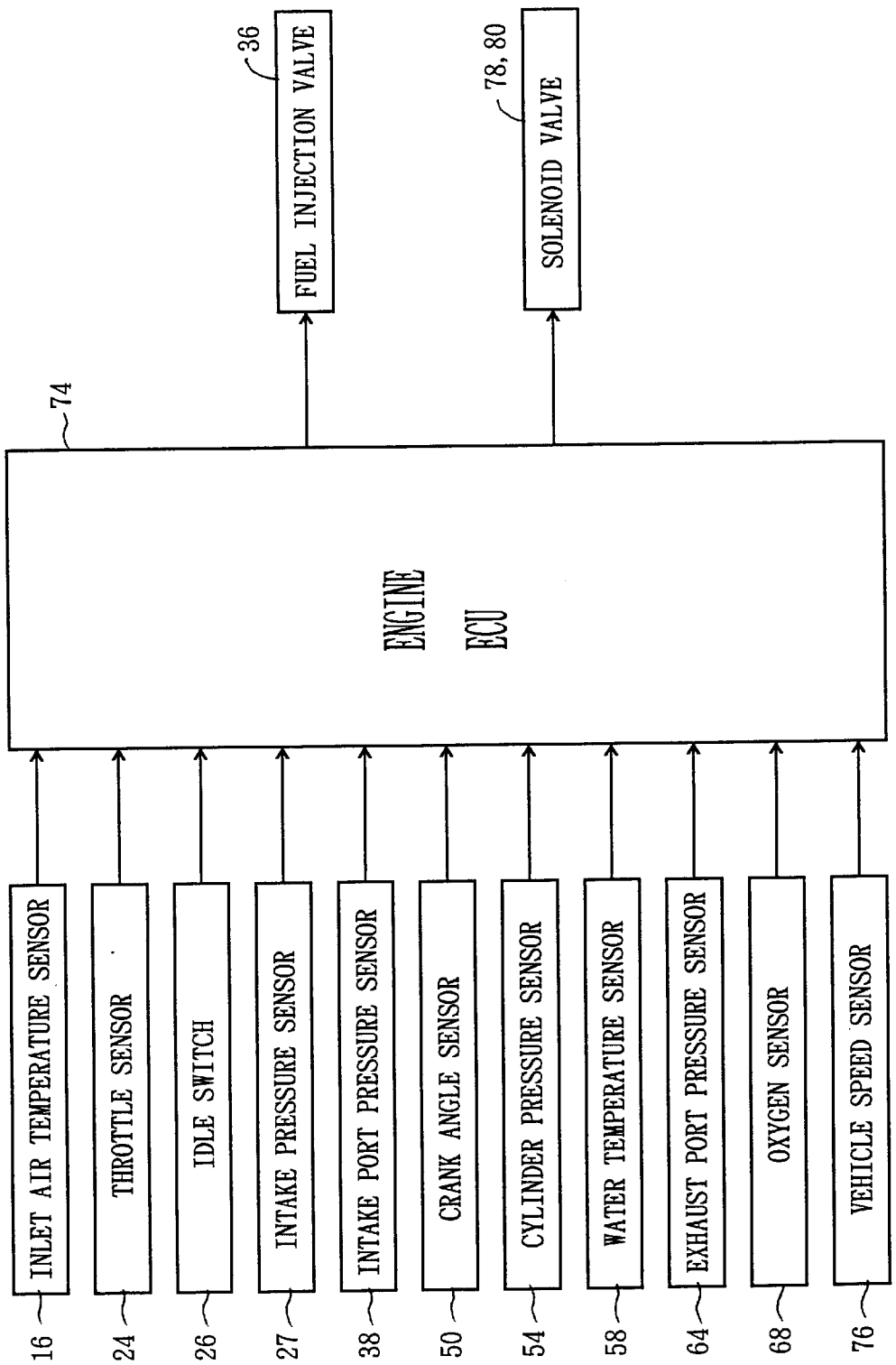
FIG. 2 is a block diagram of electric elements provided in the internal combustion engine of FIG. 1.

FIG. 2 shows the electrical elements provided in the internal combustion engine 10.

The internal combustion engine 10 is provided with an engine electronic control unit (ECU) 74. The above electrical elements of the engine 10, including the inlet air temperature sensor 16, the throttle sensor 24, the idle switch 26, the intake pressure sensor 27, the intake port pressure sensor 38, the crank angle sensor 50, the cylinder pressure sensor 54, the water temperature sensor 58, the exhaust port pressure sensor 64, and the oxygen sensor 68, are connected to inputs of the engine ECU 74. Further, a vehicle speed sensor 76 is connected to an input of the engine ECU 74. The vehicle speed sensor 76 outputs an electrical signal indicative of a running speed of the automotive vehicle carrying the engine 10.

The engine ECU 74 is made up of a microcomputer. The engine ECU 74 detects various parameters that are needed to control the internal combustion engine 10, based on the signals output by the above-mentioned sensors. Further, the fuel injection valve 36 is connected to an output of the engine ECU 74. Solenoid valves 78 and 80 are connected to outputs of the engine ECU 74. The engine ECU 74 controls the fuel injection valve 36 and the solenoid valves 78 and 80 in accordance with the parameters that have been detected based on the output signals of the above-mentioned sensors.

Figure 3:
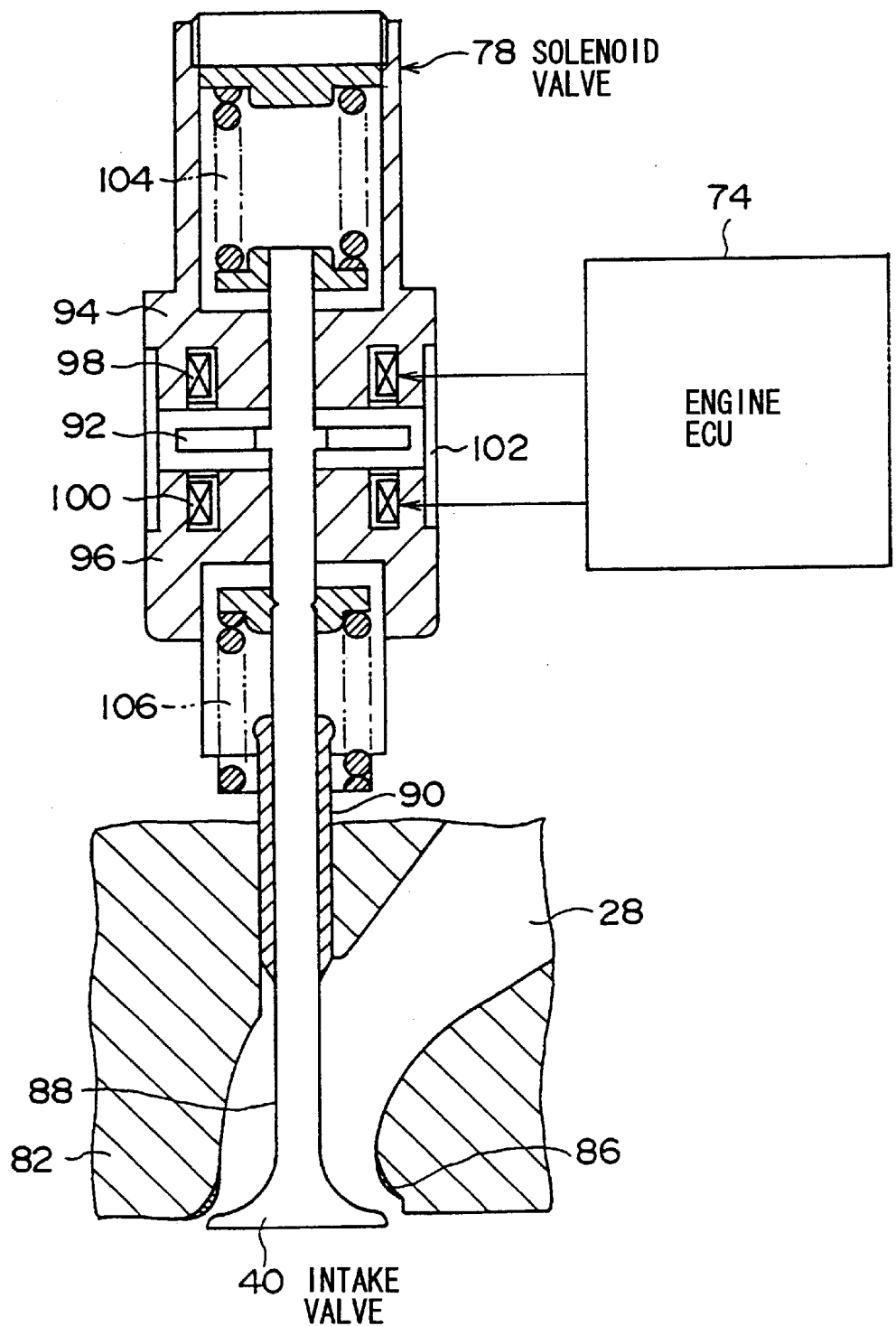
FIG. 3 is a cross-sectional view of a solenoid valve provided in the internal combustion engine of FIG. 1.

FIG. 3 is a cross-sectional view of a solenoid valve 78 provided in the internal combustion engine 10.

The solenoid valve 78 functions to displace the valve element of the intake valve 40 between the valve-open position and the valve-closed position, in order to open or close the communicating passage between the intake port 28 and the combustion chamber 44. In the present embodiment, the solenoid valves 78 and 80 are identical in structure and function, except that the solenoid valve 78 displaces the valve element of the intake valve 40 while the solenoid valve 80 displaces the valve element of the exhaust valve 60. In the following, a description will be given of the structure and functions of the solenoid valve 78, and a description of the structure and functions of the solenoid valve 80 will be omitted.

The solenoid valve 78 is connected to the above-mentioned valve element of the intake valve 40. The valve element of the intake valve 40 is a member that is arranged within a cylinder head 82. The bottom end of the valve element is, as shown in FIG. 3, exposed to the combustion chamber 44 of the internal combustion engine 10. The intake port 28 is provided in the cylinder head 82. A valve seat 86 is formed on the cylinder head 82 at the bottom end of the intake port 28, and the valve element of the intake valve 40 is brought into contact with the valve seat 86. When the valve element of the intake valve 40 rests on the valve seat 86, the communicating passage between the intake port 28 and the combustion chamber 44 is closed by the valve element of the intake valve 40. When the valve element of the intake valve 40 is separated from the valve seat 86, the communicating passage between the intake port 28 and the combustion chamber 44 is opened by the valve element of the intake valve 40.

A valve shaft 88 is fixed to the valve element of the intake valve 40. The valve shaft 88 is held by a valve guide 90 such that the valve shaft 88 is axially movable along the inside wall of the valve guide 90. An armature 92 is secured to an upper portion of the valve shaft 88. The armature 92 is an annular member that is made of, for example, a soft magnetic material. An upper core 94 is provided in the solenoid valve 78 at a position above the armature 92. A lower core 96 is provided in the solenoid valve 78 at a position below the armature 92. Both the upper core 94 and the lower core 96 are made of a magnetic material. An upper solenoid coil 98 is secured to the upper core 94. A lower solenoid coil 100 is secured to the lower core 96. An outer cylinder 102 is provided on the outer peripheral surfaces of the upper core 94 and the lower core 96. The outer cylinder 102 holds the upper core 94 and the lower core 96 such that the upper core 94 and the lower core 96 are spaced apart from each other at a given distance along the valve shaft 88, and that the distance between the upper core 94 and the lower core 96 is maintained.

Further, in the solenoid valve 78, the valve shaft 88 is resiliently supported by an upper spring 104 and a lower spring 106. Resilient forces of the upper spring 104 and the lower spring 106 are exerted on the valve shaft 88 in the opposite axial directions of the valve shaft 88. The resilient forces of the upper spring 104 and the lower spring 106 are adjusted so that a neutral position of the armature 92 matches with a middle position between the upper core 94 and the lower core 96.

The engine ECU 74 is connected at its outputs to the upper coil 98 and the lower coil 100. The engine ECU 74 controls the supply of an exciting current to each of the upper coil 98 and the lower coil 100, and the valve element of the intake valve 40 is suitably displaced between the valve-open position and the valve-closed position by using the electromagnetic forces of the upper coil 98 and the lower coil 100.

When the exciting current is not supplied to the upper coil 98 and the lower coil 100, the armature 92 is maintained at the neutral position. With the armature 92 at the neutral position, if the supply of the exciting current to the lower coil 100 is started, an electromagnetic force that attracts the armature 92 in the down direction toward the lower core 96 is produced by the lower coil 100. This electromagnetic force is exerted on the armature 92, and the valve element of the intake valve 40 is displaced toward the valve-open position together with the movement of the armature 92.

With the armature 92 being set at the lower-end position corresponding to the valve-open position, if the supply of the exciting current to the lower coil 100 is terminated, the armature 92 starts being displaced to the upper-end position corresponding to the valve-closed position by the resilient force of the lower spring 106. The supply of the exciting current to the upper coil 98 is started at a time the armature 92 reaches a certain intermediate position, and the armature 92 can be displaced to the upper-end position.

Similarly, after the above operations, the supply of the exciting current to the upper coil 98 is terminated, and the supply of the exciting current to the lower coil 100 is started again at an appropriate time. The armature 92 can be displaced from the upper-end position to the lower-end position, and the valve element of the intake valve 40 can be displaced from the valve-closed position to the valve-open position together with the movement of the armature 92.

In the present embodiment, the engine ECU 74 and the solenoid valve 78 are utilized, and the supply of the exciting current to the upper coil 98 and the supply of the exciting current to the lower coil 100 are controlled in an alternate manner. Accordingly, the valve element of the intake valve 40 can be suitably displaced between the valve-open position and the valve-closed position by using the electromagnetic forces of the upper coil 98 and the lower coil 100.

However, when the valve element of the intake valve 40 is displaced between the valve-open position and the valve-closed position, an internal pressure of the combustion chamber 44 (which is called the engine cylinder pressure) and a pressure of the intake port 28 (which is called the engine port pressure) act on the valve element of the intake valve 40 in the mutually-opposite directions. For this reason, the electromagnetic force needed to set the intake valve 40 in the valve-open position will be increased when the engine cylinder pressure is higher than the engine port pressure, and the needed electromagnetic force will be decreased when the engine cylinder pressure is lower than the engine port pressure.

Similarly, the electromagnetic force needed to set the intake valve 40 in the valve-closed position will be decreased when the engine cylinder pressure is higher than the engine port pressure, and the needed electromagnetic force will be increased when the engine cylinder pressure is lower than the engine port pressure. Therefore, in order to properly operate the solenoid valve with low power consumption, regardless of how the engine cylinder pressure and the engine port pressure act on the valve element of the intake valve 40, it is desirable to suitably adjust or change the exciting current supplied to each of the upper coil 98 and the lower coil 100, in accordance with the pressure (inclusive of the engine cylinder pressure and the engine port pressure) acting on the valve element of the intake valve 40.

The above-mentioned relationship between the electromagnetic force (needed to set the intake valve 40 in the valve-open position or the valve-closed position), the engine cylinder pressure and the engine port pressure is also applicable to the case of the exhaust valve 60. Similarly to the intake valve 40, when the exhaust valve 60 is displaced between the valve-open position and the valve-closed position, the engine cylinder pressure and the pressure of the exhaust port 66 (which is called the engine port pressure) act on the valve element of the exhaust valve 60 in the mutually-opposite directions.

The above-mentioned exhaust valve pressure related to the exhaust valve 60 is higher than the intake valve pressure related to the intake valve 40. The electromagnetic force needed to set the exhaust valve 60 in the valve-open position or the valve-closed position is larger than that of the intake valve 40.

In the present embodiment, the engine ECU 74 detects an intake valve pressure (Xi) acting on the valve element of the intake valve 40, based on the output signal of the cylinder pressure sensor 54 and the output signal of the intake port pressure sensor 38. The engine ECU 74 detects an exhaust valve pressure (Xe) acting on the valve element of the exhaust valve 60, based on the output signal of the cylinder pressure sensor 54 and the output signal of the exhaust port pressure sensor 64.

Further, in the present embodiment, the engine ECU 74 adjusts the amount of the exciting current supplied to the upper coil 98 and the lower coil 100 in the solenoid valves 78 and 80, to a controlled value based on the detected pressure (Xi) and the detected pressure (Xe). The controlled value of the exciting current causes the upper coil 98 or the lower coil 100 of the solenoid valves 78 and 80 to produce the least possible electromagnetic force that is needed to displace the intake valve 40 or the exhaust valve 60 between the valve-open position and the valve-closed position.

Therefore, the solenoid valve control apparatus of the present embodiment properly adjusts the magnitude of the electromagnetic force to the controlled value based on the valve-element pressure, and the solenoid valve control apparatus of the present embodiment is effective in properly operating the solenoid valve with low power consumption and with reliable and smooth valve element operation.

Next, a description will be provided of a first preferred embodiment of the solenoid valve control apparatus of the invention with reference to FIG. 4 through FIG. 8.

FIG. 4 through FIG. 7 show a control process executed by the engine ECU 74 of the first preferred embodiment of the solenoid valve control apparatus. The execution of the control process shown in FIG. 4 through FIG. 7 is repeatedly initiated each time the control process is terminated.

Figure 4:
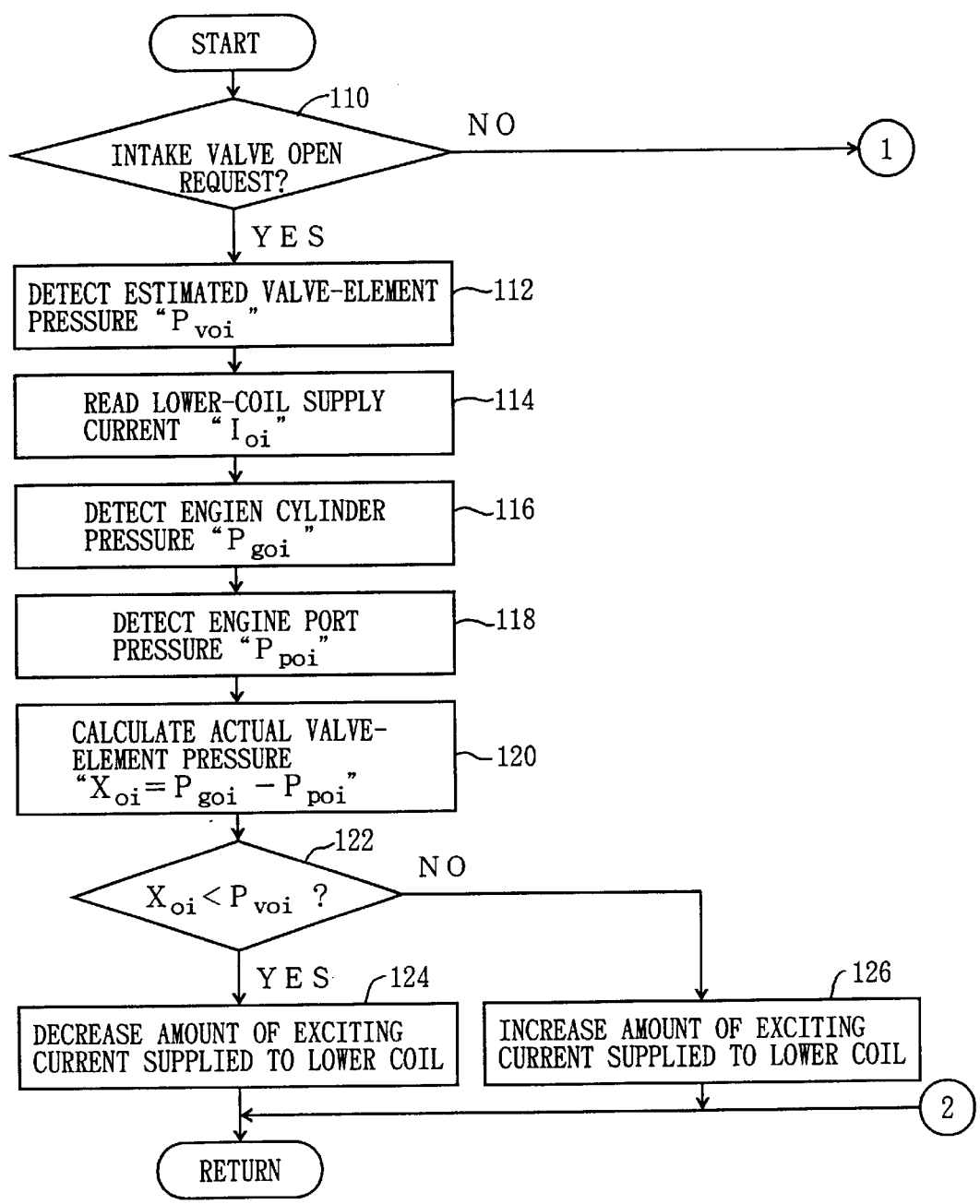
FIG. 4 is a flowchart for explaining a first portion of a control process executed by a first preferred embodiment of the solenoid valve control apparatus of the invention.

FIG. 4 shows a first portion of the control process executed by the engine ECU 74 of the first preferred embodiment of the solenoid valve control apparatus. At a start of the control process, step 110 in the flowchart of FIG. 4 is executed by the engine ECU 74.

Step 110 determines whether an intake valve open request that causes the intake valve 40 to be set in the valve-open position takes place. If the result at step 110 is affirmative, the control of the engine ECU 74 is transferred to the next step 112.

Step 112 detects an estimated valve-element pressure "Pvoi" on the valve element of the intake valve 40 based on the output signals of the various sensors. The estimated valve-element pressure "Pvoi", detected in the step 112, is stored in the memory of the engine ECU 74. The estimated valve-element pressure "Pvoi" corresponds to a pressure acting on the valve element of the intake valve 40 when setting the intake valve 40 in the valve-open position.

Figure 8:
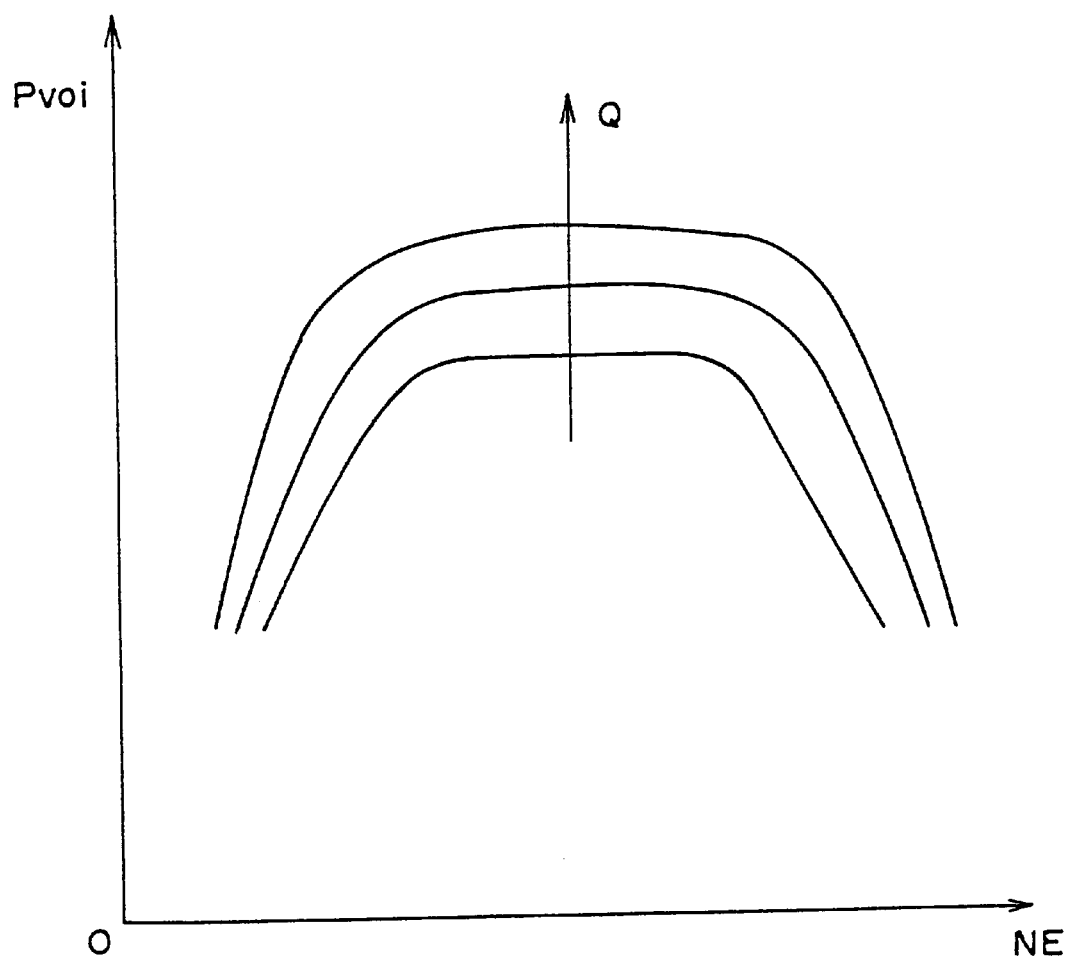
FIG. 8 is a diagram for explaining a map that indicates the relationship between the engine speed and the estimated valve-element pressure with different parameter values of the engine load.

FIG. 8 shows a map that indicates the relationship between the engine speed (NE) and the estimated valve-element pressure (Pvoi) with different parameter values of the engine load (Q). The map shown in FIG. 8 is stored in advance in the memory of the engine ECU 74. The engine ECU 74 at the above step 112 detects the estimated valve-element pressure "Pvoi" by accessing the map shown in FIG. 8.

Step 114 reads a lower-coil supply current "Ioi" that is defined as being the amount of an exciting current supplied to the lower coil 100 when setting the intake valve 40 in the valve-open position.

Step 116 detects an engine cylinder pressure "Pgoi" with respect to the combustion chamber 44 based on the output signal of the cylinder pressure sensor 54.

Step 118 detects an engine port pressure "Ppoi" with respect to the intake port 28 based on the output signal of the intake port pressure sensor 38.

Step 120 calculates an actual valve-element pressure "Xoi" (="Pgoi"–"Ppoi") based on the engine cylinder pressure "Pgoi" detected in the step 116 and the engine port pressure "Ppoi" detected in the step 118.

Step 122 determines whether the actual valve-element pressure "Xoi" is smaller than the estimated valve-element pressure "Pvoi". When the result at the step 122 is affirmative ("Xoi"<"Pvoi"), it is determined that the actual engine cylinder/port pressure, acting on the valve element of the intake valve 40 in the valve-closing direction opposite to the valve-opening direction, is smaller than the estimated valve-element pressure, and the magnitude of the electromagnetic force to displace the valve element of the intake valve 40 to the valve-open position should be decreased for a low power consumption. In this case, the control of the engine ECU 74 is transferred to step 124.

On the other hand, when the result at the step 122 is negative ("Xoi">"Pvoi"), it is determined that the actual engine cylinder/port pressure, acting on the valve element of the intake valve 40, is larger than the estimated valve-element pressure, and the magnitude of the electromagnetic force to displace the valve element of the intake valve 40 to the valve-open position should be increased for a reliable and smooth intake valve operation. In this case, the control of the engine ECU 74 is transferred to step 126.

Step 124 decreases the amount of the exciting current supplied the lower coil 100, based on the difference between the pressure "Xoi" and the pressure "Pvoi". The decreased amount of the exciting current is supplied to the lower coil 100 of the solenoid valve 78, and the magnitude of the electromagnetic force to attract the armature 92 (or the valve element of the intake valve 40) toward the lower core 96 is decreased. As described above, the solenoid valve control apparatus of the present embodiment is effective in properly operating the solenoid valve 78 with low power consumption. After the step 124 is performed, the present cycle of the control process is terminated.

Step 126 increases the amount of the exciting current supplied to the lower coil 100, based on the difference between the pressure "Xoi" and the pressure "Pvoi". The increased amount of the exciting current is supplied to the lower coil 100 of the solenoid valve 78, and the magnitude of the electromagnetic force to attract the armature 92 toward the lower core 96 is increased against the large valve-element pressure. As described above, the solenoid valve control apparatus of the present embodiment is effective in properly operating the solenoid valve 78 with a reliable and smooth valve element operation. After the step 126 is performed, the present cycle of the control process is terminated.

Figure 5:
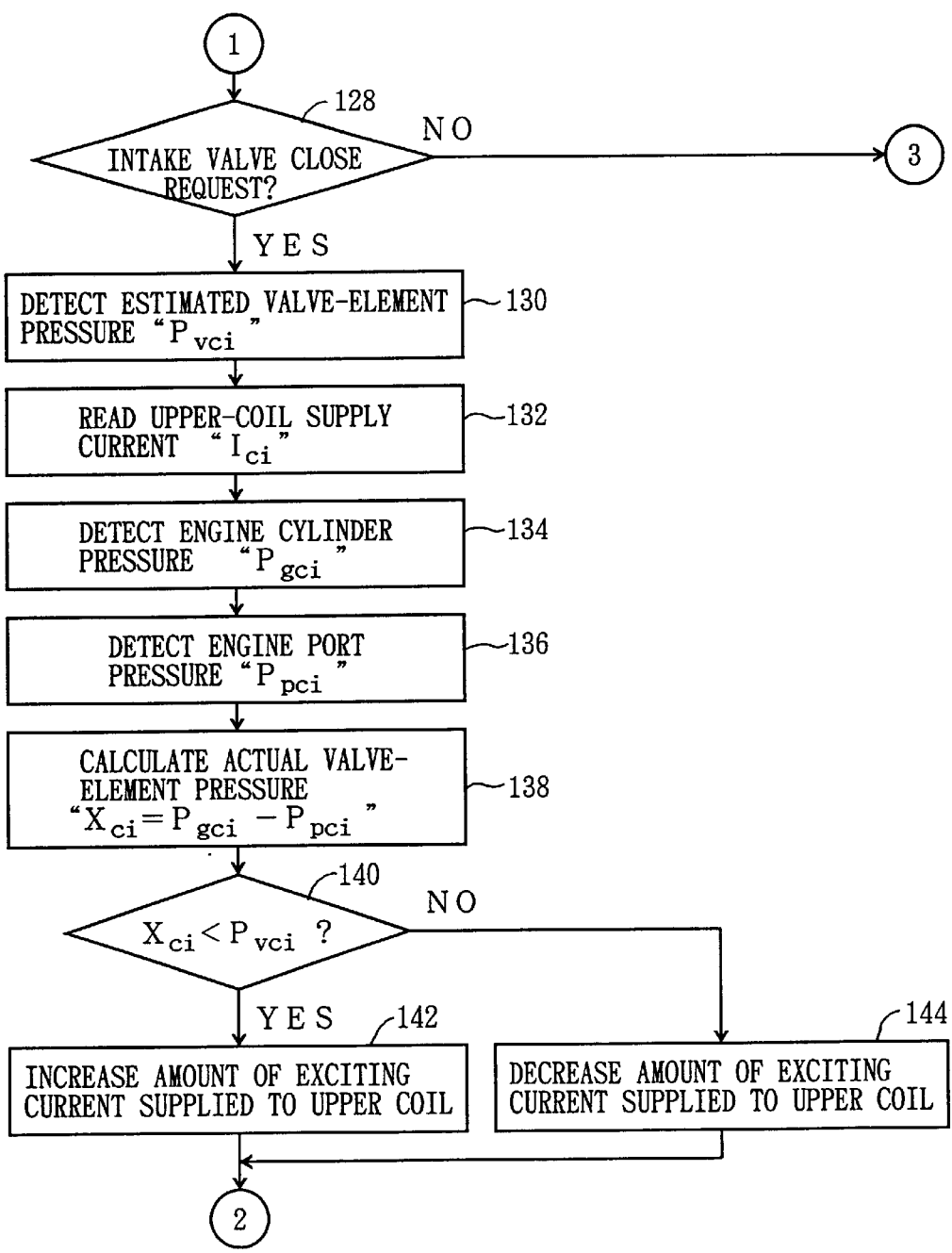
FIG. 5 is a flowchart for explaining a second portion of the control process executed by the first preferred embodiment of the solenoid valve control apparatus.

FIG. 5 shows a second portion of the control process executed by the engine ECU 74 of the first preferred embodiment of the solenoid valve control apparatus. When the result at step 110 in the flowchart of FIG. 4 is negative, step 128 in the flowchart of FIG. 5 is executed by the engine ECU 74.

Step 128 determines whether an intake valve close request that causes the intake valve 40 to be set in the valve-closed position takes place. If the result at step 110 is affirmative, the control of the engine ECU 74 is transferred to the next step 130.

Step 130 detects an estimated valve-element pressure "Pvci" on the valve element of the intake valve 40 based on the output signals of the various sensors. The estimated valve-element pressure "Pvci", detected in the step 130, is stored in the memory of the engine ECU 74. The estimated valve-element pressure "Pvci" corresponds to a pressure acting on the valve element of the intake valve 40 when setting the intake valve 40 in the valve-closed position.

A map that is similar to the map shown in FIG. 8 is stored in advance in the memory of the engine ECU 74. The engine ECU 74 at the step 130 detects the estimated valve-element pressure "Pvci" by accessing this map.

Step 132 reads an upper-coil supply current "Ici" that is defined as being the amount of an exciting current supplied to the upper coil 98 when setting the intake valve 40 in the valve-closed position.

Step 134 detects an engine cylinder pressure "Pgci" with respect to the combustion chamber 44 based on the output signal of the cylinder pressure sensor 54.

Step 136 detects an engine port pressure "Ppci" with respect to the intake port 28 based on the output signal of the intake port pressure sensor 38.

Step 138 calculates an actual valve-element pressure "Xci" (="Pgci"–"Ppci") based on the engine cylinder pressure "Pgci" detected in the step 134 and the engine port pressure "Ppci" detected in the step 136.

Step 140 determines whether the actual valve-element pressure "Xci" is smaller than the estimated valve-element pressure "Pvci". When the result at the step 140 is affirmative ("Xci"<"Pvci"), it is determined that the actual engine cylinder/port pressure, acting on the valve element of the intake valve 40 in the valve-closing direction opposite to the valve-opening direction, is smaller than the estimated valve-element pressure, and the magnitude of the electromagnetic force to displace the valve element of the intake valve 40 to the valve-closed position should be increased for a reliable and smooth valve-element operation. In this case, the control of the engine ECU 74 is transferred to step 142.

On the other hand, when the result at the step 140 is negative ("Xci">"Pvci"), it is determined that the actual engine cylinder/port pressure, acting on the valve element of the intake valve 40, is larger than the estimated valve-element pressure, and the magnitude of the electromagnetic force to displace the valve element of the intake valve 40 to the valve-closed position should be decreased for a low power consumption. In this case, the control of the engine ECU 74 is transferred to step 144.

Step 142 increases the amount of the exciting current supplied to the upper coil 98, based on the difference between the pressure "Xci" and the pressure "Pvci". The increased amount of the exciting current is supplied to the upper coil 98 of the solenoid valve 78, and the magnitude of the electromagnetic force to attract the armature 92 (or the valve element of the intake valve 40) toward the upper core 94 is increased. As described above, the solenoid valve control apparatus of the present embodiment is effective in properly operating the solenoid valve 78 with a reliable and smooth valve-element operation. After the step 142 is performed, the present cycle of the control process is terminated.

Step 144 decreases the amount of the exciting current supplied to the upper coil 98, based on the difference between the pressure "Xci" and the pressure "Pvci". The decreased amount of the exciting current is supplied to the upper coil 98 of the solenoid valve 78, and the magnitude of the electromagnetic force to attract the armature 92 toward the upper core 94 is decreased. As described above, the solenoid valve control apparatus of the present embodiment is effective in properly operating the solenoid valve 78 with low power consumption. After the step 144 is performed, the present cycle of the control process is terminated.

Figure 6:
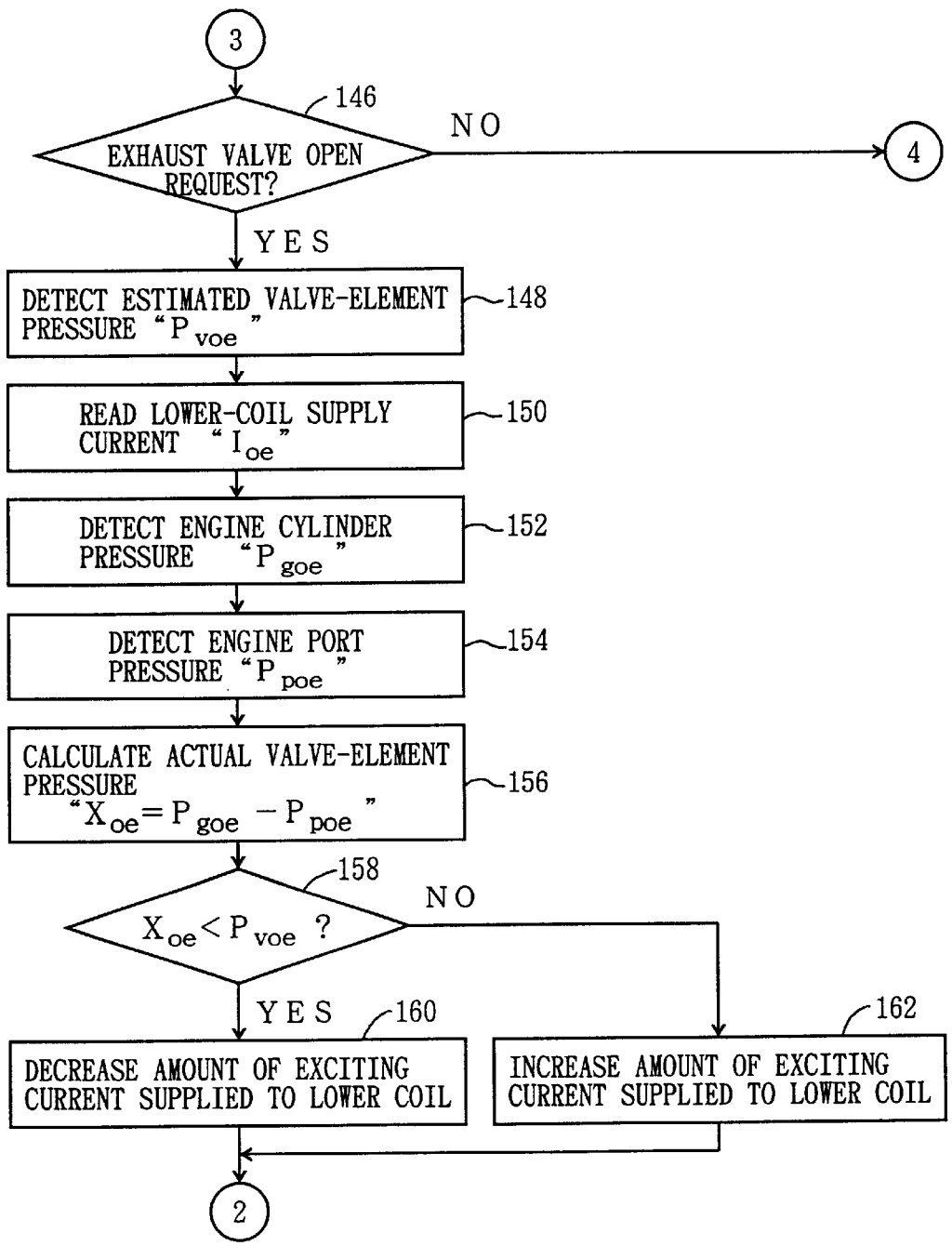
FIG. 6 is a flowchart for explaining a third portion of the control process executed by the first preferred embodiment of the solenoid valve control apparatus.

FIG. 6 shows a third portion of the control process executed by the engine ECU 74 of the first preferred embodiment of the solenoid valve control apparatus. When the result at step 128 in the flowchart of FIG. 5 is negative, step 146 in the flowchart of FIG. 6 is executed by the engine ECU 74.

Step 146 determines whether an exhaust open request that causes the exhaust valve 60 to be set in the valve-open position takes place. If the result at step 146 is affirmative, the control of the engine ECU 74 is transferred to the next step 148.

Step 148 detects an estimated valve-element pressure "Pvoe" on the valve element of the exhaust valve 60 based on the output signals of the various sensors. The estimated valve-element pressure "Pvoe", detected in the step 148, is stored in the memory of the engine ECU 74. The estimated valve-element pressure "Pvoe" corresponds to a pressure acting on the valve element of the exhaust valve 60 when setting the exhaust valve 60 in the valve-open position.

A map that is similar to the map shown in FIG. 8 is stored in advance in the memory of the engine ECU 74. The engine ECU 74 at the step 148 detects the estimated valve-element pressure "Pvoe" by accessing this map.

Step 150 reads a lower-coil supply current "Ioe" that is defined as being the amount of an exciting current supplied to the lower coil 100 when setting the exhaust valve 60 in the valve-open position.

Step 152 detects an engine cylinder pressure "Pgoe" with respect to the combustion chamber 44 based on the output signal of the cylinder pressure sensor 54.

Step 154 detects an engine port pressure "Ppoe" with respect to the exhaust port 66 based on the output signal of the exhaust port pressure sensor 64.

Step 156 calculates an actual valve-element pressure "Xoe" (="Pgoe"–"Ppoe") based on the engine cylinder pressure "Pgoe" detected in the step 152 and the engine port pressure "Ppoe" detected in the step 154.

Step 158 determines whether the actual valve-element pressure "Xoe" is smaller than the estimated valve-element pressure "Pvoe". When the result at the step 158 is affirmative ("Xoe"<"Pvoe"), it is determined that the actual engine cylinder/port pressure, acting on the valve element of the exhaust valve 60 in the valve-closing direction opposite to the valve-opening direction, is smaller than the estimated valve-element pressure, and the magnitude of the electromagnetic force to displace the valve element of the exhaust valve 60 to the valve-open position should be decreased for a low power consumption. In this case, the control of the engine ECU 74 is transferred to step 160.

On the other hand, when the result at the step 158 is negative ("Xoe">"Pvoe"), it is determined that the actual engine cylinder/port pressure, acting on the valve element of the exhaust valve 60, is larger than the estimated valve-element pressure, and the magnitude of the electromagnetic force to displace the valve element of the exhaust valve 60 to the valve-open position should be increased for a reliable and smooth valve-element operation. In this case, the control of the engine ECU 74 is transferred to step 162.

Step 160 decreases the amount of the exciting current supplied to the low coil 100, based on the difference between the pressure "Xoe" and the pressure "Pvoe". The decreased amount of the exciting current is supplied to the upper coil 100 of the solenoid valve 80, and the magnitude of the electromagnetic force to attract the armature 92 (or the valve element of the exhaust valve 60) toward the lower core 96 is decreased. As described above, the solenoid valve control apparatus of the present embodiment is effective in properly operating the solenoid valve 78 with a low power consumption. After the step 160 is performed, the present cycle of the control process is terminated.

Step 162 increases the amount of the exciting current supplied to the lower coil 100, based on the difference between the pressure "Xoe" and the pressure "Pvoe". The increased amount of the exciting current is supplied to the lower coil 100 of the solenoid valve 80, and the magnitude of the electromagnetic force to attract the armature 92 toward the lower core 96 is increased. As described above, the solenoid valve control apparatus of the present embodiment is effective in properly operating the solenoid valve 80 with a reliable and smooth valve-element operation. After the step 162 is performed, the present cycle of the control process is terminated.

Figure 7:
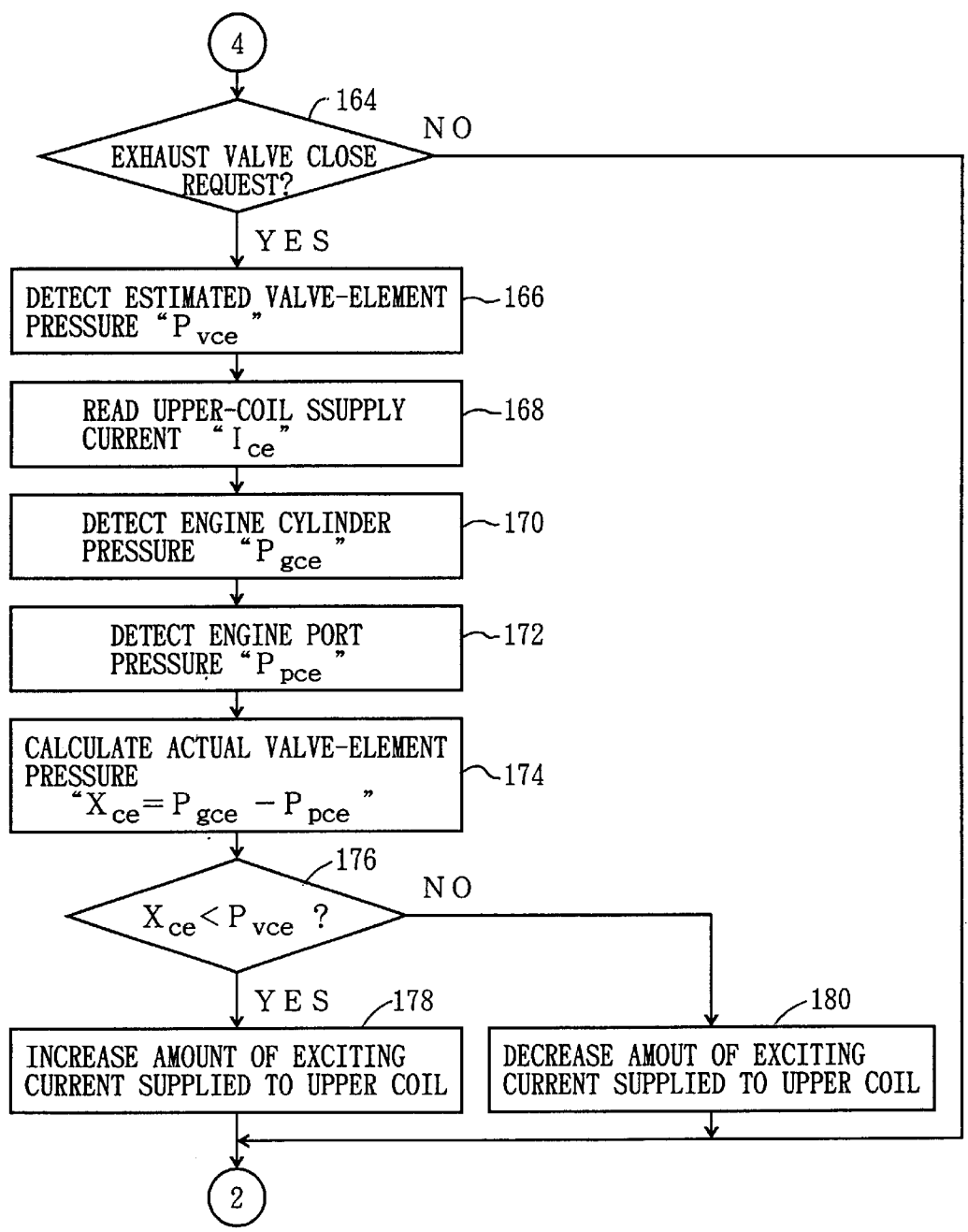
FIG. 7 is a flowchart for explaining a fourth portion of the control process executed by the first preferred embodiment of the solenoid valve control apparatus.

FIG. 7 shows a fourth portion of the control process executed by the engine ECU 74 of the first preferred embodiment of the solenoid valve control apparatus. When the result at step 146 in the flowchart of FIG. 6 is negative, step 164 in the flowchart of FIG. 7 is executed by the engine ECU 74.

Step 164 determines whether an exhaust valve close request that causes the exhaust valve 60 to be set in the valve-closed position takes place. If the result at step 164 is affirmative, the control of the engine ECU 74 is transferred to the next step 166.

Step 166 detects an estimated valve-element pressure "Pvce" on the valve element of the exhaust valve 60 based on the output signals of the various sensors. The estimated valve-element pressure "Pvce", detected in the step 166, is stored in the memory of the engine ECU 74. The estimated valve-element pressure "Pvce" corresponds to a pressure acting on the valve element of the exhaust valve 60 when setting the exhaust valve 60 in the valve-closed position.

A map that is similar to the map shown in FIG. 8 is stored in advance in the memory of the engine ECU 74. The engine ECU 74 at the step 166 detects the estimated valve-element pressure "Pvce" by accessing this map.

Step 168 reads an upper-coil supply current "Ice" that is defined as being the amount of an exciting current supplied to the upper coil 98 when setting the exhaust valve 60 in the valve-closed position.

Step 170 detects an engine cylinder pressure "Pgce" with respect to the combustion chamber 44 based on the output signal of the cylinder pressure sensor 54.

Step 172 detects an engine port pressure "Ppce" with respect to the exhaust port 66 based on the output signal of the intake port pressure sensor 38.

Step 174 calculates an actual valve-element pressure "Xce" (="Pgce"−"Ppce") based on the engine cylinder pressure "Pgce" detected in the step 170 and the engine port pressure "Ppce" detected in the step 172.

Step 176 determines whether the actual valve-element pressure "Xce" is smaller than the estimated valve-element pressure "Pvce". When the result at the step 176 is affirmative ("Xce"<"Pvce"), it is determined that the actual engine cylinder/port pressure, acting on the valve element of the exhaust valve 60 in the valve-closing direction opposite to the valve-opening direction, is smaller than the estimated valve-element pressure, and the magnitude of the electromagnetic force to displace the valve element of the intake valve 40 to the valve-closed position should be increased for a reliable and smooth valve-element operation. In this case, the control of the engine ECU 74 is transferred to step 178.

On the other hand, when the result at the step 176 is negative ("Xce">"Pvce"), it is determined that the actual engine cylinder/port pressure, acting on the valve element of the exhaust valve 60, is larger than the estimated valve-element pressure, and the magnitude of the electromagnetic force to displace the valve element of the exhaust valve 60 to the valve-closed position should be decreased for a low power consumption. In this case, the control of the engine ECU 74 is transferred to step 180.

Step 178 increases the amount of the exciting current supplied to the upper coil 98, based on the difference between the pressure "Xce" and the pressure "Pvce". The increased amount of the exciting current is supplied to the upper coil 98 of the solenoid valve 80, and the magnitude of the electromagnetic force to attract the armature 92 (or the valve element of the exhaust valve 60) toward the upper core 94 is increased. As described above, the solenoid valve control apparatus of the present embodiment is effective in properly operating the solenoid valve 80 with a reliable and smooth valve-element operation. After the step 178 is performed, the present cycle of the control process is terminated.

Step 180 decreases the amount of the exciting current supplied to the upper coil 98 of the solenoid valve 80, based on the difference between the pressure "Xce" and the pressure "Pvce". The decreased amount of the exciting current is supplied to the upper coil 98 of the solenoid valve 80, and the magnitude of the electromagnetic force to attract the armature 92 toward the upper core 94 is decreased. As described above, the solenoid valve control apparatus of the present embodiment is effective in properly operating the solenoid valve 80 with low power consumption. After the step 180 is performed, the present cycle of the control process is terminated.

According to the above-described control process, the solenoid valve control apparatus of the present embodiment can adjust the amount of the exciting current supplied to the upper coil 98 and the lower coil 100 in the solenoid valves 78 and 80, to a controlled value based on the difference between the detected pressure (Xi) and the detected pressure (Xe). The controlled value of the exciting current causes the upper coil 98 or the lower coil 100 of the solenoid valves 78 and 80 to produce the least possible electromagnetic force that is needed to displace the intake valve 40 or the exhaust valve 60 between the valve-open position and the valve-closed position.

Therefore, the solenoid valve control apparatus of the present embodiment properly adjusts the magnitude of the electromagnetic force to the controlled value based on the valve-element pressure, and the solenoid valve control apparatus of the present embodiment is effective in properly operating the solenoid valve with low power consumption and with reliable and smooth valve element operation.

In the above-described embodiment, the upper spring 104 and the lower spring 106 correspond to the elastic member described in this application. The upper core 94 with the upper coil 98, and the lower core 96 with the lower coil 100 correspond to the solenoid coil described in this application. The steps 116–120, 134–138, 152–156, and 170–174 executed by the engine ECU 74 correspond to the pressure detection means described in this application. The steps 122–126, 140–144, 158–162, and 176–180 executed by the engine ECU 74 correspond to the electromagnetic force adjustment means described in this application.

Further, in the above-described embodiment, the steps 116, 134, 152, and 170 executed by the engine ECU 74 correspond to the cylinder pressure detection means described in this application. The steps 118, 136, 154, and 172 executed by the engine ECU 74 correspond to the port pressure detection means described in this application.

Figure 9:
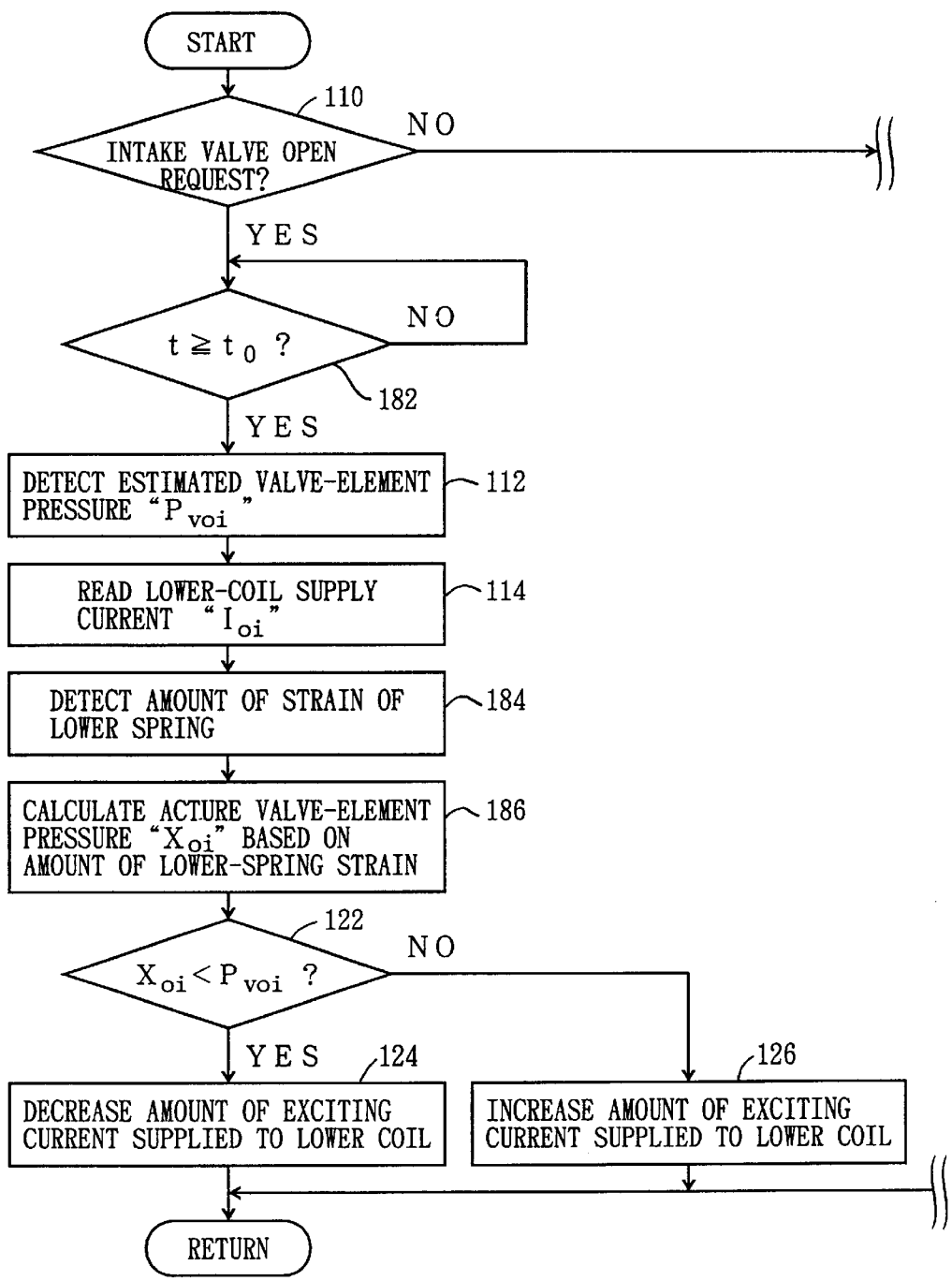
FIG. 9 is a flowchart for explaining a main portion of a control process executed by a second preferred embodiment of the solenoid valve control apparatus of the invention.
Figure 10:
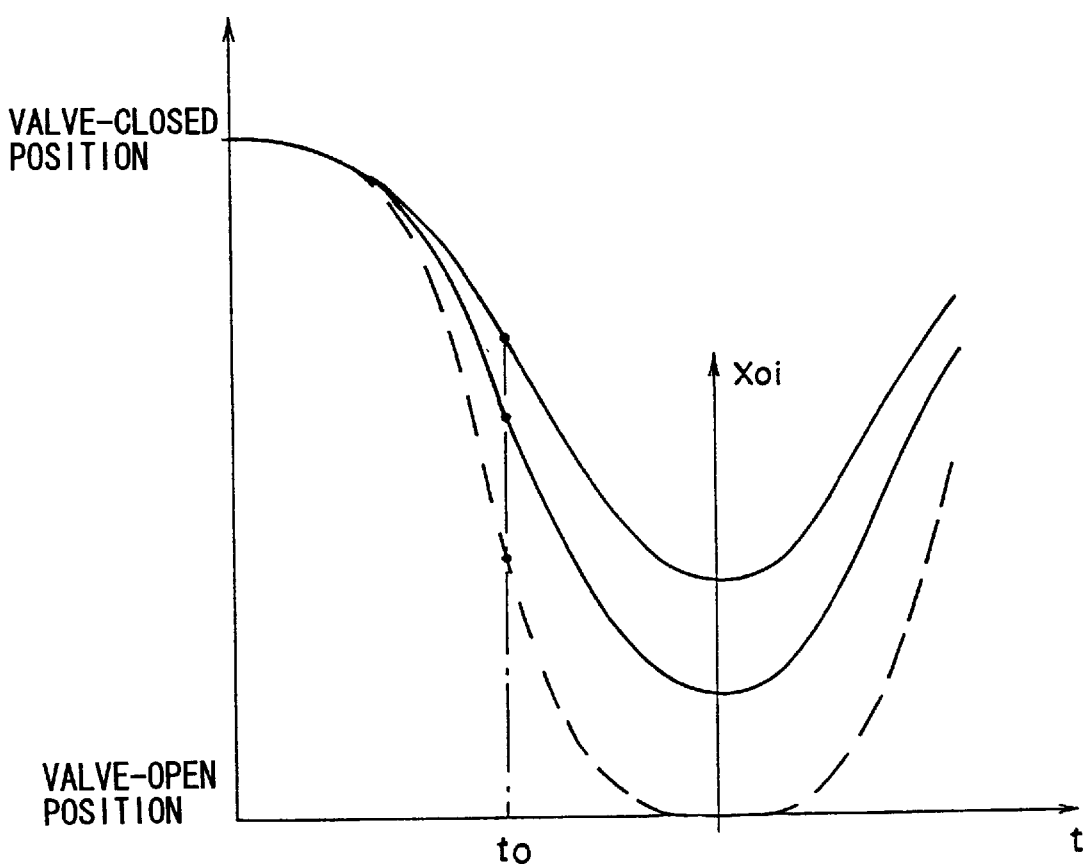
FIG. 10 is a time chart for explaining a time-dependent change of the displacement of an intake valve with different parameter values of the actual intake valve pressure.
Figure 11:
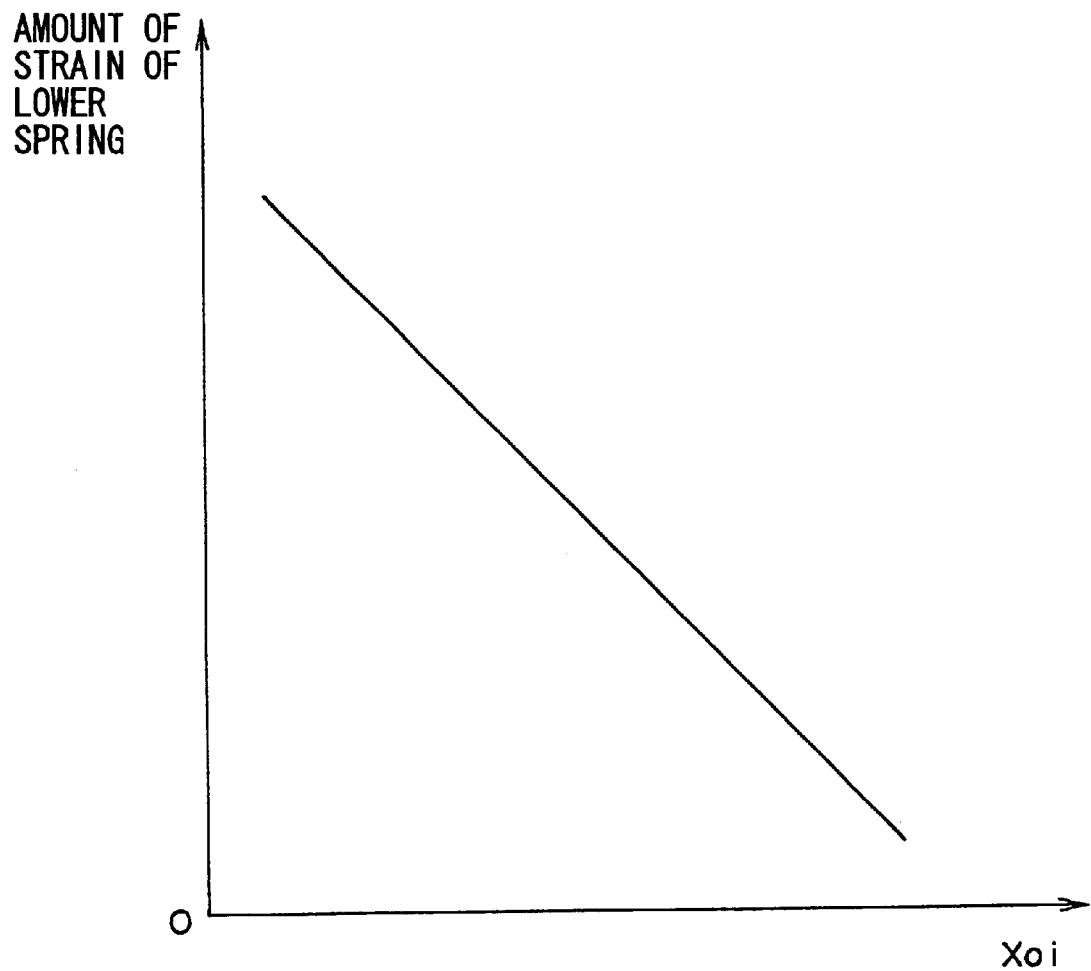
FIG. 11 is a diagram for explaining a map that indicates the relationship between the actual intake valve pressure and the elastic member strain.

Next, a description will be provided of a second preferred embodiment of the solenoid valve control apparatus of the invention with reference to FIG. 9 through FIG. 11. In the present embodiment, the engine ECU 74 executes a control process shown in FIG. 9 in the internal combustion engine shown in FIG. 1, in place of the control process shown in FIG. 4 through FIG. 7.

FIG. 9 shows a main portion of the control process executed by the engine ECU 74 of the second preferred embodiment of the solenoid valve control apparatus. The execution of the control process shown in FIG. 9 is repeatedly initiated each time the control process is terminated. In FIG. 9, the steps which are essentially the same as corresponding steps in FIG. 4 are designated by the same reference numerals, and a description thereof will be simplified or omitted.

At a start of the control process, the engine ECU 74 executes step 110 in the flowchart of FIG. 9. Step 110 determines whether an intake valve open request that causes the intake valve 40 to be set in the valve-open position takes place. If the result at step 110 is affirmative, the control of the engine ECU 74 is transferred to the next step 182.

Step 182 determines whether the elapsed time "t" since the occurrence of the intake valve open request exceeds a predetermined period "$t_0$". The step 182 is repeated until the result at the step 182 is affirmative. After the predetermined period has elapsed ($t \geq t_0$), the control of the engine ECU 74 is transferred to the next step 112.

Step 112 detects an estimated valve-element pressure "Pvoi" on the valve element of the intake valve 40 based on the output signals of the various sensors. Step 114 reads a lower-coil supply current "Ioi" that is defined as being the amount of an exciting current supplied to the lower coil 100 when setting the intake valve 40 in the valve-open position. After the steps 112 and 114 are performed, the next step 184 is executed by the engine ECU 74.

Step 184 detects an amount of strain of the lower spring 106 based on an output signal of a strain gauge or the like that is secured to the lower spring 106.

Step 186 calculates an actual valve-element pressure "Xoi", which acts on the valve element of the intake valve 40, based on the amount of strain of the lower spring 106 detected in the step 184.

FIG. 10 shows a time-dependent change of the displacement of the intake valve 40 with different parameter values of the actual intake valve actuating pressure Xoi.

As shown in FIG. 10, when the predetermined period has elapsed since the occurrence of the intake valve open request (the time "$t_0$" indicated in FIG. 10), the displacement of the intake valve 40 from the valve-open position will be increased as the intake valve actuating pressure Xoi becomes larger. The amount of strain of the lower spring 106 will be decreased as the displacement of the intake valve 40 from the valve-open position becomes larger. Therefore, the amount of strain of the lower spring 106 will be decreased as the intake valve actuating pressure Xoi becomes larger.

FIG. 11 shows a map that indicates the relationship between the intake valve actuating pressure Xoi with respect to the intake valve 40 and the elastic member strain with respect to the lower spring 106. The map shown in FIG. 11 is stored in advance in the memory of the engine ECU 74. The engine ECU 74 at the above step 186 calculates the actual valve-element pressure "Xoi" from the detected amount of strain of the lower spring 106 by accessing the map shown in FIG. 11.

After the step 186 is performed, the subsequent steps 122, 124 and 126 are executed by the engine ECU 74.

The above-described control steps are carried out when the intake valve open request takes place. Similar to the first preferred embodiment, in the present embodiment, the control steps which are essentially the same as the control steps shown in FIG. 5, FIG. 6 and FIG. 7 are carried out for the respective cases in which the intake valve close request, the exhaust valve open request, and the exhaust valve close request take place.

According to the above-described control process, the actual valve-element pressure on the exhaust valve 60 or the intake valve 40 is detected based on the amount of strain of the upper spring 104 or the lower spring 106. The solenoid valve control apparatus of the present embodiment can properly adjust the amount of the exciting current supplied to the upper coil 98 and the lower coil 100 in the solenoid valves 78 and 80, to a controlled value based on the valve-element pressure. The controlled value of the exciting current causes the upper coil 98 or the lower coil 100 of the solenoid valves 78 and 80 to produce the least possible electromagnetic force that is needed to displace the intake valve 40 or the exhaust valve 60 between the valve-open position and the valve-closed position.

Therefore, the solenoid valve control apparatus of the present embodiment properly adjusts the magnitude of the electromagnetic force to the controlled value based on the valve-element pressure, and the solenoid valve control apparatus of the present embodiment is effective in properly operating the solenoid valve with low power consumption and with reliable and smooth valve element operation. executed by the engine EUC 74 correspond to the elastic-member strain detection means described in this application.

In the above-described embodiment, the actual valve-element pressure on the exhaust valve 60 or the intake valve 40 is detected from the amount of strain of the upper spring 104 or the lower spring 106. Alternatively, the actual valve-element pressure may be detected by detecting a whole length of the upper spring 104 or the lower spring 106. In this modification, a suitable sensing device attached to the elastic member (the upper spring 104 or the lower spring 106) is used, and the engine ECU 74 detects a whole length of the elastic member based on an output signal of the sensing device at a time a predetermined period has elapsed after a start of the displacement of the valve element (that is, the occurrence of a valve open/close request with respect to the exhaust valve 60 or the intake valve 40). The engine ECU 74 detects the actual valve-element pressure on the exhaust valve 60 or the intake valve 40, based on the detected whole length of the elastic member. In the above-mentioned embodiment, the detection of the whole length of the elastic member executed by the engine EUC 74 corresponds to the elastic-member length detection means described in this application .

Figure 12:
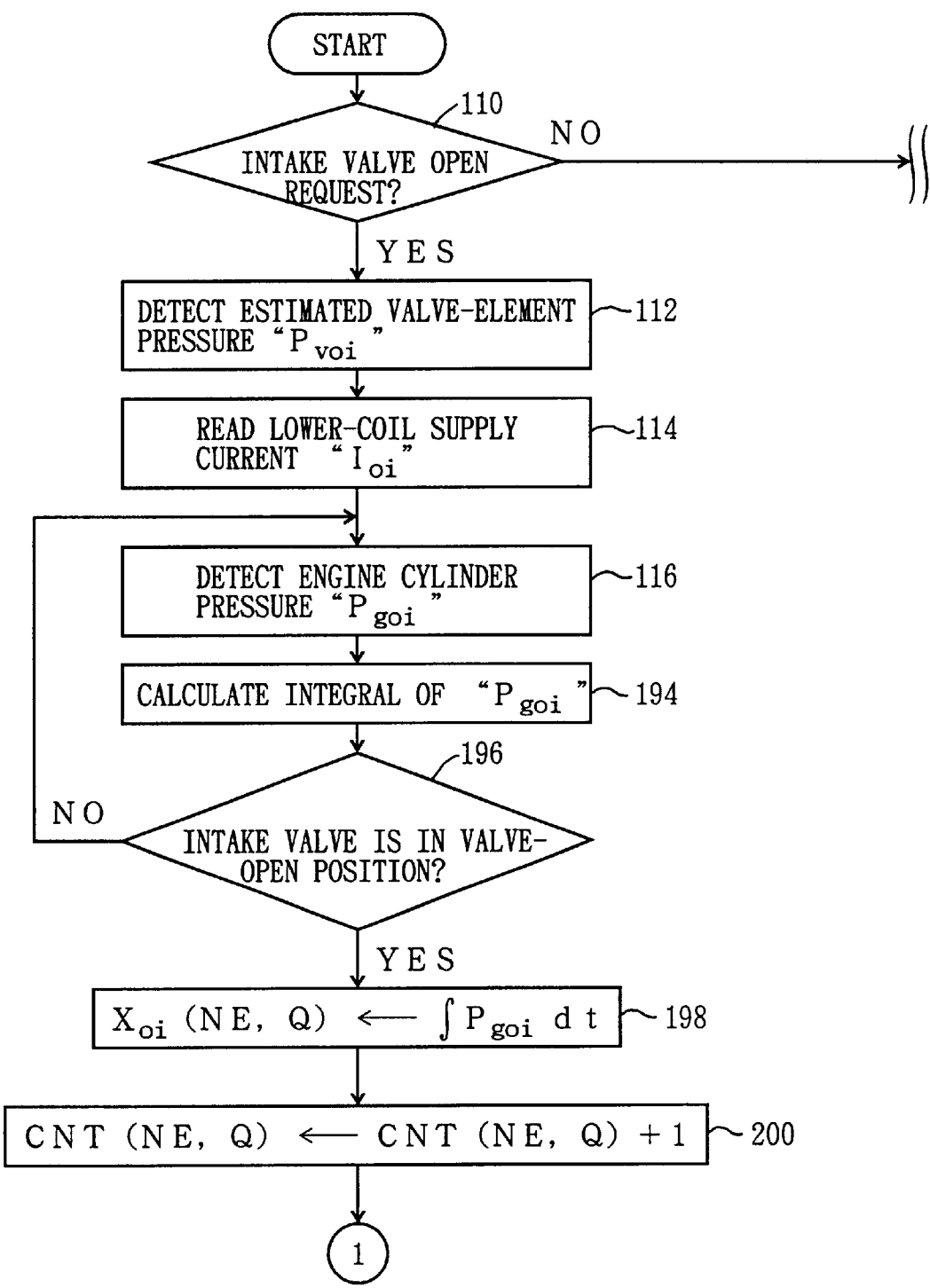
FIG. 12 is a flowchart for explaining a first portion of a control process executed by a third preferred embodiment of the solenoid valve control apparatus of the invention.
Figure 13:
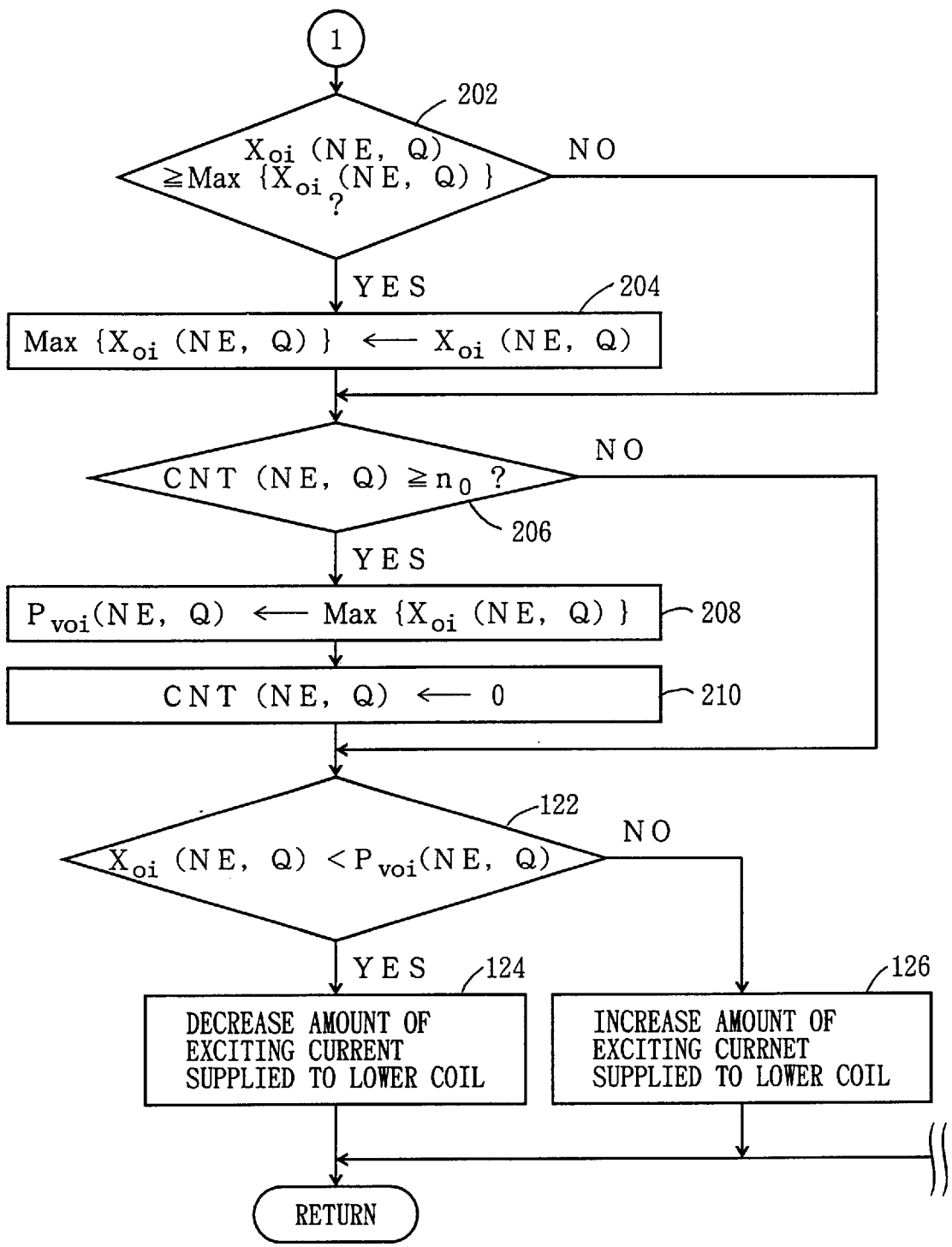
FIG. 13 is a flowchart for explaining a second portion of the control process executed by the third preferred embodiment of the solenoid valve control apparatus.

Next, a description will be provided of a third preferred embodiment of the solenoid valve control apparatus of the invention with reference to FIG. 12 and FIG. 13. In the present embodiment, the engine ECU 74 executes a control process shown in FIG. 12 and FIG. 13 in the internal combustion engine shown in FIG. 1, in place of the control process shown in FIG. 4 through FIG. 7.

FIG. 12 and FIG. 13 show a main portion of the control process executed by the engine ECU 74 of the second preferred embodiment of the solenoid valve control apparatus. The execution of the control process shown in FIG. 12 and FIG. 13 is repeatedly initiated each time the control process is terminated. In FIG. 12 and FIG. 13, the steps which are essentially the same as corresponding steps in FIG. 4 are designated by the same reference numerals, and a description thereof will be simplified or omitted.

At a start of the control process, the engine ECU 74 executes step 110 in the flowchart of FIG. 12. Step 110 determines whether an intake valve open request that causes the intake valve 40 to be set in the valve-open position takes place. If the result at step 110 is affirmative, the control of the engine ECU 74 is transferred to the steps 112 through 116. After the steps 112 through 116 are performed, the next step 194 is executed by the engine ECU 74.

Step 194 calculates an integral of the engine cylinder pressure "Pgoi" of the combustion chamber 44 with respect to time.

Step 196 determines whether the intake valve 40 is in the valve-open position. When the result at the step 196 is negative, the intake valve 40 is not in the valve-open position but at an intermediate position between the valve-open position and the valve-closed position. In this case, the control of the engine ECU 74 is transferred to the above step 116. On the other hand, when the result at the step 196 is affirmative, the next step 198 is executed by the engine ECU 74.

Step 198 determines the valve-element pressure "Xoi" (acting on the intake valve 40) by the value of the integral of the engine cylinder pressure "Pgoi" over the period from the time the intake valve open request occurs to the time the intake valve 40 reaches the valve-open position. The valve-element pressure "Xoi" determined in the step 198 is stored in the memory of the engine ECU 74 as the pressure Xoi (NE, Q) that is related to the current engine speed "NE" and the current engine load "Q".

Step 200 increments the counter CNT (NE, Q). The counter CNT (NE, Q) is provided to count the number of occurrences of the intake valve open request under the operating conditions of the engine defined by the current engine speed "NE" and the current engine load "Q".

Step 202 determines whether the valve-element pressure Xoi (NE, Q) obtained in the step 198 is larger than or equal to the maximum valve-element pressure Max {Xoi (NE, Q)} that has been obtained before the present cycle of the control process. When the result at the step 202 is affirmative (Xoi (NE, Q)≧Max {Xoi (NE, Q)}), the following step 204 is executed. On the other hand, when the result at the step 202 is negative, the step 206 is executed without performing the following step 204.

Step 204 determines the new maximum valve-element pressure Max {Xoi (NE, Q)} by setting the valve-element pressure Xoi (NE, Q) obtained in the step 198 at the present cycle. By performing the step 204, the engine ECU 74 updates the maximum valve-element pressure Max {Xoi (NE, Q)} that acts on the valve element of the intake valve 40, to the new one step by step.

Step 206 determines whether the valve of the counter CNT (NE, Q) that is incremented in the step 200 is larger than or equal to a predetermined number "$n_0$". When the result at the step 206 is affirmative (CNT (NE, Q)$\geq n_0$), the following steps 208 and 210 are executed. On the other hand, when the result at the step 206 is negative, the step 122 is executed without performing the following steps 208 and 210.

Step 208 determines the estimated valve-element pressure "Pvoi (NE, Q)" by using the maximum valve-element pressure Max {Xoi (NE, Q)}. It is supposed with the estimated valve-element pressure "Pvoi (NE, Q)" that the maximum valve-element pressure Max {Xoi (NE, Q)}, which is detected during the period the intake valve open request took place by "$n_0$" times under the same operating conditions of the engine defined by the engine speed "NE" and the engine load "Q", actually acts on the valve element of the intake valve 40. By performing the step 208, the engine ECU 74 updates the estimated valve-element pressure "Pvoi" to the appropriate value.

Step 210 resets the counter CNT (NE, Q) to zero. After the step 210 is performed, the following steps 122, 124 and 126 are executed, and then the present cycle of the control process is terminated.

In the above-described control process, when the estimated valve-element pressure "Pvoi (NE, Q)" is determined in the step 208, the estimated valve-element pressure "Pvoi (NE, Q)" is stored as the learning value. The estimated valve-element pressure "Pvoi (NE, Q)", determined in the step 208, is used as the threshold valve that is compared with the actual valve-element pressure "Xoi (NE, Q)" each time the step 122 is executed.

According to the above-described control process, the adjustment of the exciting current supplied to the upper coil 98 or the lower coil 100 is carried out based on the comparison between the actual valve-element pressure Xoi (NE, Q) and the estimated valve-element pressure Pvoi (NE, Q). The above-described control process is hardly influenced by the difference between individual engine products, and it is possible for the solenoid valve control apparatus of the present embodiment to properly adjust the magnitude of the electromagnetic force to the controlled value based on the detected valve-element pressure, and the solenoid valve control apparatus of the present embodiment is effective in properly operating the solenoid valve with low power consumption and with reliable and smooth valve element operation.

Similar to the first preferred embodiment, in the present embodiment, the control steps which are essentially the same as the control steps shown in FIG. 5, FIG. 6 and FIG. 7 are carried out for the respective cases in which the intake valve close request, the exhaust valve open request, and the exhaust valve close request take place. Such control steps for the respective cases are essentially the same as corresponding control steps shown in FIG. 12 and FIG. 13, and a description thereof will be omitted.

In the above-described first through third preferred embodiments, the amount of the exciting current supplied to the upper coil 98 or the lower coil 100 is increased or decreased based on the difference between the actual valve-element pressure (acting on the valve element of the intake valve 40 or the exhaust valve 60) and the estimated valve-element pressure. However, the present invention is not limited to these preferred embodiments. Some modifications can be made without departing from the scope of the present invention.

In one modified embodiment, the amount of the exciting current supplied to the upper coil 98 or the lower coil 10 is preset to a reference amount that allows reliable and smooth valve element operation of the intake valve 40 or the exhaust valve 60. The amount of the exciting current is reduced from the reference amount based on the actual valve-element pressure, only when the intake valve 40 or the exhaust valve 60 is easily set in the valve-open position or the valve-closed position. Further, in another modified embodiment, the amount of the exciting current is preset to a small reference amount. The amount of the exciting current is increased from the small reference amount based on the actual valve-element pressure, only when the condition of the intake valve 40 or the exhaust valve 60 is difficult to be set in the valve-open position or the valve-closed position.

Next, a description will be provided of a fourth preferred embodiment of the solenoid valve control apparatus of the invention with reference to FIG. 1 through FIG. 3 and FIG. 14 through FIG. 18. In the present embodiment, the engine ECU 74 executes a control process shown in FIG. 16 in the internal combustion engine shown in FIG. 1.

Figure 14:
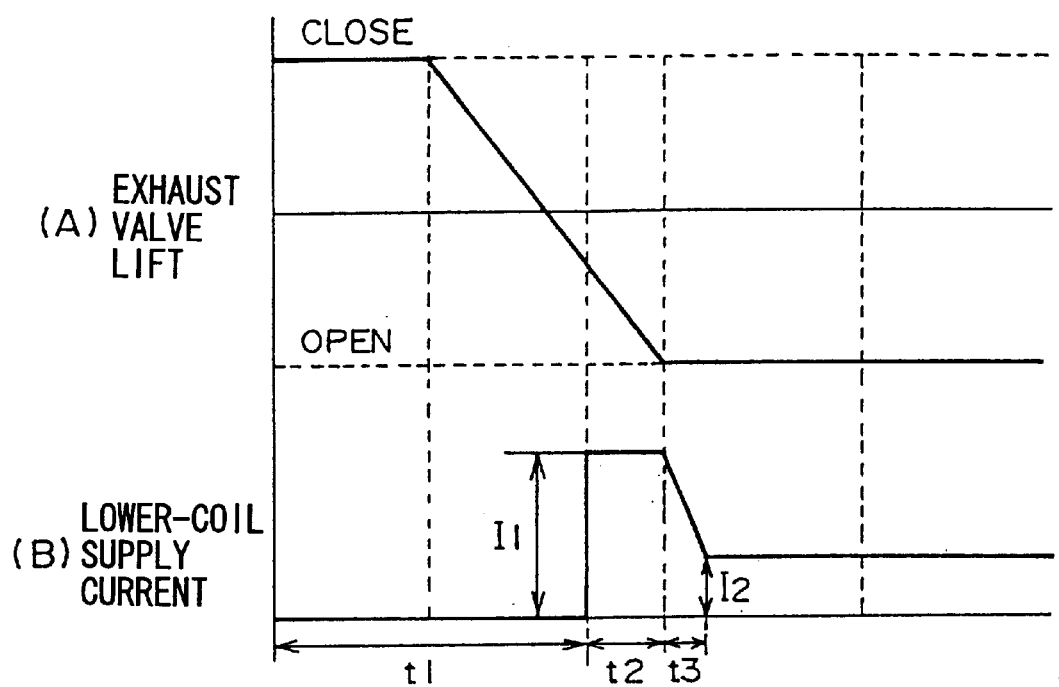
FIG. 14 is a time chart for explaining a change of the exhaust valve lift and a change of the exhaust valve actuating current used by a fourth preferred embodiment of the solenoid valve control apparatus of the invention.

FIG. 14 shows a change of the exhaust valve lift from the valve-closed position to the valve-open position with respect to the exhaust valve 60 (the change being indicated by (A) in FIG. 14) and a change of the exhaust valve actuating current to the lower coil 100 of the solenoid valve 80 with respect to the exhaust valve 60 (the change being indicated by (B) in FIG. 14), which are used by the fourth preferred embodiment of the solenoid valve control apparatus.

As indicated by (B) in FIG. 14, the exciting current to be supplied to the lower coil 100 rises from "zero" current to an attraction current "I1" at an end of an off period "t1" which corresponds to a certain portion of a period for which the valve element of the exhaust valve 60 is displaced from the valve-closed position to the valve-open position. During the off period "t1" indicated by (B) in FIG. 14, the exciting current is maintained at "zero" current.

After the end of the off period "t1", the exciting current is maintained at the attraction current "I1" for an attraction period "t2". The attraction period "t2" corresponds to the remaining portion of the period for the displacement of the exhaust valve 60 from the valve-closed position to the valve-open position. After an end of the attraction period "t", the exciting current is reduced from the attraction current "I1" to a retained current "I2" during a reduction period "t3". After an end of the reduction period "t3", the exciting current is maintained at the retained current "I2" until an exhaust valve close request with respect to the exhaust valve 60 takes place.

By using the above waveform of the exciting current, the electromagnetic force to displace the valve element of the exhaust valve 60 can be increased to a large value immediately before the exhaust valve 60 reaches the valve-open position, which will provide a reliable, smooth valve-element operation. Further, the electromagnetic force can be reduced to a small value immediately after the exhaust valve 60 reaches the valve-open position, and the electromagnetic force is maintained at the small value when the exhaust valve 60 is in the valve-open position, which will provide a low power consumption and good silentness.

In the case of the above waveform of the exciting current to be supplied to the lower coil 100, the off period t1 should be reduced and the attraction period t2 and the reduction period t3 should be increased when enlarging the electromagnetic force to attract the exhaust valve 60 to the valve-open position. In addition, when enlarging the electromagnetic force to attract the exhaust valve 60 to the valve-open position, the attraction current I1 and the retained current I2 should be increased. On the other hand, when reducing the power consumption of the solenoid valve 80, the off period t1 should be increased and the attraction period t2 and the reduction period t3 should be reduced. In addition, when reducing the power consumption of the solenoid valve 80, the attraction current I1 and the retained current I2 should be reduced.

When the valve element of the intake valve 40 or the exhaust valve 60 is displaced from one of the valve-open position and the valve-closed position to the other position, the repulsive force also acts on the valve element in a direction to prevent the displacement of the valve element, the magnitude of which varies depending on the engine cylinder pressure and the engine port pressure. Therefore, proper adjustment of the waveform of the exciting current supplied to the solenoid valve 78 or 80 which is carried out in accordance with the valve-element pressure will be effective in achieving both a low power consumption and a reliable, smooth valve-element operation.

Figure 15:
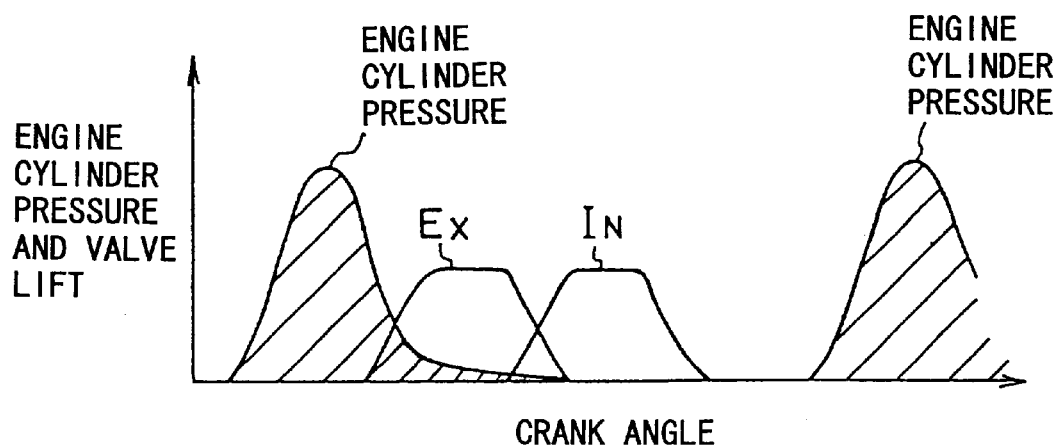
FIG. 15 is a diagram for explaining a relationship between the crank angle and the cylinder pressure, a relationship between the crank angle and the exhaust valve lift, and a relationship between the crank angle and the intake valve lift.

FIG. 15 shows a relationship between the crank angle and the engine cylinder pressure, a relationship between the crank angle and the exhaust valve lift with respect to the exhaust valve 60, and a relationship between the crank angle and the intake valve lift with respect to the intake valve 40. The engine cylinder pressure rises to a large pressure each time the combustion process of the internal combustion engine is performed. As shown in FIG. 15, the engine cylinder pressure takes the maximum value immediately before the exhaust valve 60 reaches the valve-open position. The displacement of the exhaust valve 60 from the valve-closed position to the valve-open position is started while the engine cylinder pressure is still high.

The engine cylinder pressure is maintained at a sufficiently low level at the time the exhaust valve 60 is displaced from the valve-open position to the valve-closed position, at the time the intake valve 40 is displaced from the valve-closed position to the valve-open position, and at the time the intake valve 40 is displaced from the valve-open position to the valve-closed position. However, at the time of the exhaust valve open request with respect to the exhaust valve 60, the valve-element pressure is significantly influenced by the engine cylinder pressure. Hence, proper adjustment of the waveform of the exciting current supplied to the lower coil 100 of the solenoid valve 80 which is carried out in accordance with the valve-element pressure at the time of the exhaust valve open request is very effective in achieving both a low power consumption and a reliable, smooth valve-element.

The internal pressure of the serge tank 20 or the intake port 28 is set to the atmospheric pressure after a stop of the engine operation. At a start of the engine operation, a large amount of air (and a corresponding amount of fuel) is supplied to the internal combustion engine even if the throttle valve 22 is set in the fully closed position. For this reason, at a start of the engine operation, a high engine cylinder pressure is produced, which is equivalent to the engine cylinder pressure when the throttle valve 22 is set in the fully open position.

Under the conditions in which a high engine cylinder pressure is produced, such as at a start of the engine operation, it is necessary to create a large electromagnetic force by the solenoid valve at the time of an exhaust valve open request with respect to the exhaust valve 60. Hence, at the time of the exhaust valve open request, it is necessary that the exciting current supplied to the lower coil 100 of the solenoid valve 80 be adjusted in accordance with the valve-element pressure, so as to increase the exciting current to a large value at the time of the exhaust valve open request.

By taking the above matters into consideration, in the present embodiment, the exciting current supplied to the lower coil 100 of the solenoid valve 80, which produces the electromagnetic force to displace the valve element of the exhaust valve 60 to the valve-open position, is adjusted to a predetermined large current level at a start of the engine operation. Accordingly, by supplying the adjusted exciting current to the lower coil 100, the magnitude of the electromagnetic force to displace the valve element to the valve-open position is adjusted to a controlled value based on a predetermined high pressure. After the engine operation is recovered to a normal condition, the exciting current is adjusted through a mapping calculation to a controlled value based on the valve-element pressure (caused by the engine cylinder pressure and the engine port pressure).

Figure 16:
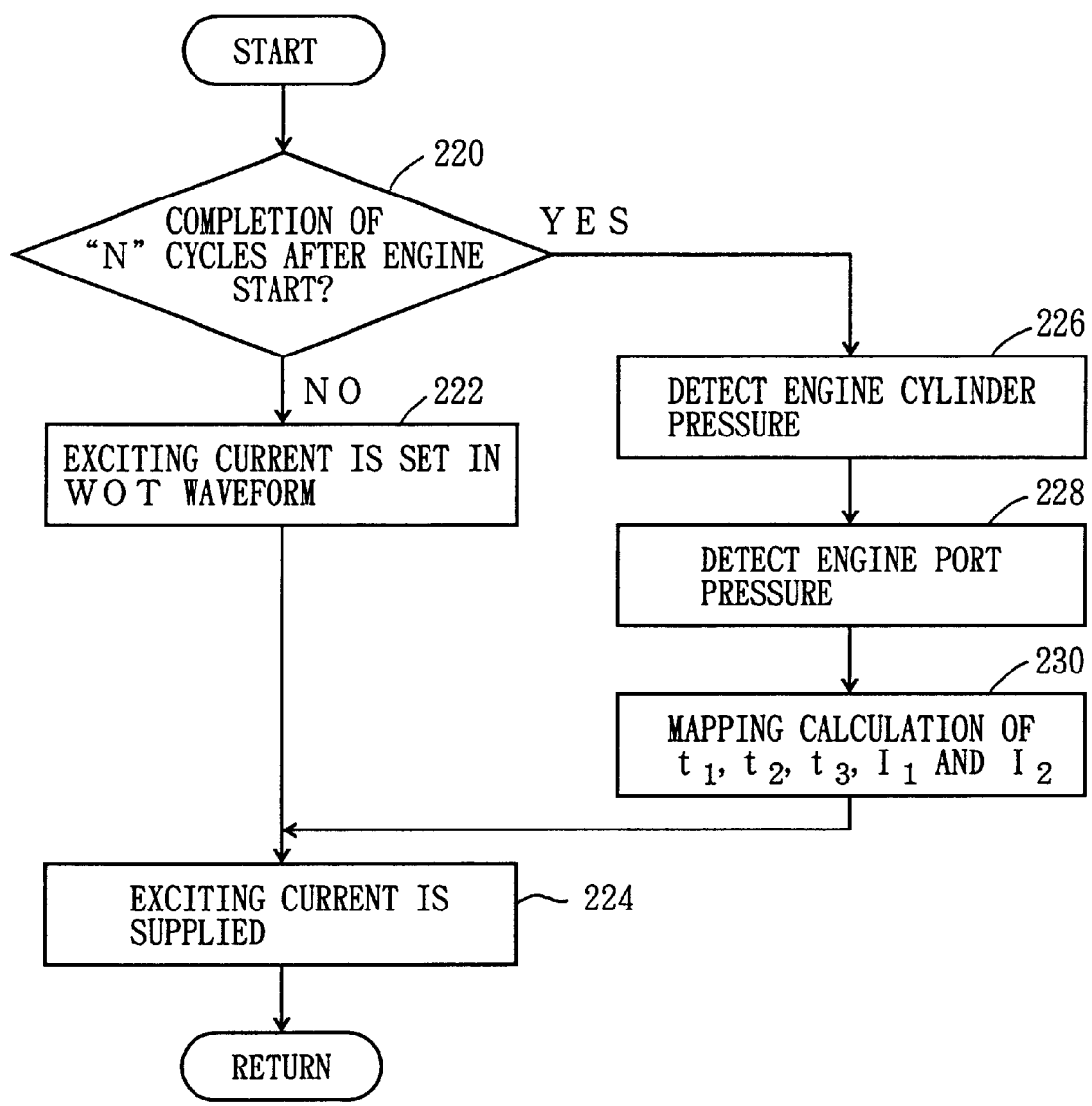
FIG. 16 is a flowchart for explaining a control process executed by the fourth preferred embodiment of the solenoid valve control apparatus.

FIG. 16 shows a control process executed by the engine ECU 74 of the fourth preferred embodiment of the solenoid valve control apparatus. The execution of the control process shown in FIG. 16 is repeatedly initiated each time the exhaust valve open request with respect to the exhaust valve 60 takes place. At a start of the control process, the engine ECU 74 executes step 220 in the flowchart of FIG. 16.

Step 220 determines whether "N" cycles of the operations on the internal combustion engine are completed after a start of the engine operation. The completion of the "N" cycles of the engine operations is necessary for the internal pressure of the serge tank 20 or the intake port 28 to be set at an appropriate vacuum pressure after the time the engine operation is started. When the result at the step 220 is negative, the next step 222 is executed by the engine ECU 74. In this condition, the valve-element pressure on the exhaust valve 60 is higher than a predetermined high pressure.

Step 222 sets the exciting current, supplied to the lower coil 100 of the solenoid valve 80, in a wide-open throttle (WOT) waveform. The WOT waveform is configured such that the off period "t1" is set at the minimum, and the attraction period "t2", the reduction period "t2", the attraction current "I1" and the retained current "I2" are set at the maximum. When the exciting current in the WOT waveform is supplied to the lower coil 100 of the solenoid valve 80, it is possible to provide a reliable, smooth valve-element operation of the exhaust valve 60 even at the start of the engine operation when the internal pressure of the combustion chamber 44 becomes very high.

Step 224 supplies the exciting current, which has been set in the appropriate waveform at the present cycle of the control process, to the lower coil 100 of the solenoid valve 80. After the step 224 is performed, the present cycle of the control process is terminated.

When the result at the step 220 is affirmative, the control of the engine ECU 74 is transferred to step 226.

Step 226 detects an engine cylinder pressure based on the output signal of the cylinder pressure sensor 54. The step 226 is executed shortly after the exhaust valve open request takes place, and at this time the engine cylinder pressure is nearly at the maximum level. It is possible that the engine ECU 74 accurately detects the engine cylinder pressure by performing the step 226.

Step 228 detects an engine port pressure based on the output signal of the exhaust port pressure sensor 64.

Step 230 calculates the actual valve-element pressure based on a difference between the engine cylinder pressure and the engine port pressure. Further, step 230 calculates the time values "t1", "t2" and "t3" and the current values "I1" and "I2" based on the actual valve-element pressure, or calculates the time values "t1", "t2" and "t3" and the current values "I1" and "I2" through a mapping based on the engine cylinder pressure and the engine port pressure.

Figure 17:
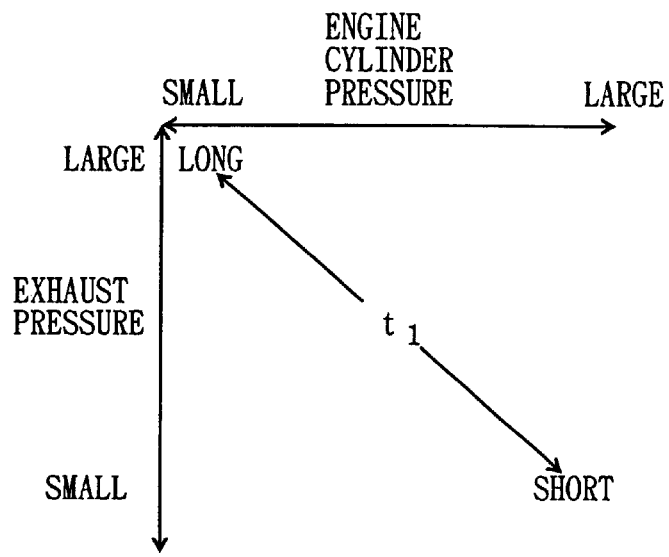
FIG. 17 is a diagram for explaining a map used by the fourth preferred embodiment of the solenoid valve control apparatus.

FIG. 17 shows an example of a map of the off period "t1" stored in the engine ECU 74. In the above step 230, the engine ECU 74 calculates the time value of the off period "t1" by using the map shown in FIG. 17. In the map shown in FIG. 17, the off period "t1" becomes shorter as the engine cylinder pressure becomes larger and the exhaust port pressure becomes smaller.

Figure 18:
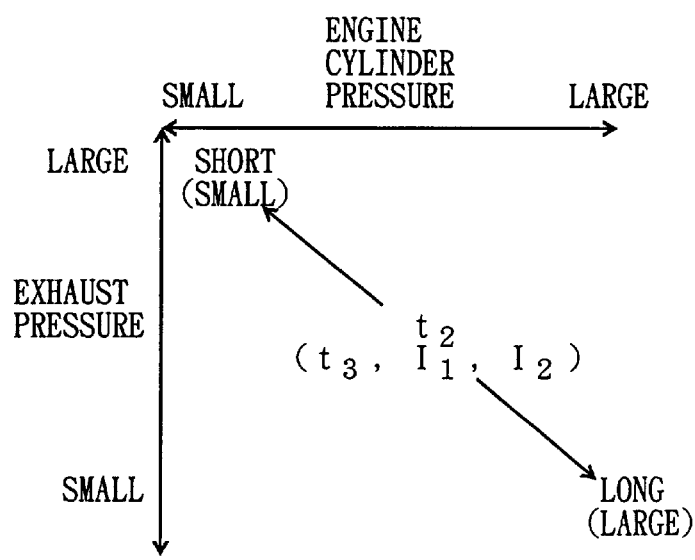
FIG. 18 is a diagram for explaining another map used by the fourth preferred embodiment of the solenoid valve control apparatus.

FIG. 18 shows an example of a map of the attraction period "t2" stored in the engine ECU 74. In the engine ECU 74, a map of the reduction period "t3", a map of the attraction current "I1", and a map of the retained current "I2", which are all similar to the map shown in FIG. 18, are stored. In the above step 230, the engine ECU 74 calculates the time values "t2" and "t3" and the current values "I1" and "I2" by using these maps stored in the engine ECU 74. In the above maps, the attraction period "t2", the reduction period "t3", the attraction current "I1" and the retained current "I2" become longer or larger as the engine cylinder pressure becomes larger and the exhaust port pressure becomes smaller.

After the above step 230 is performed, the next step 224 is executed by the engine ECU 74. According to the above-described control process, the engine ECU 74 can properly adjust the exciting current, supplied to the lower coil 100 of the solenoid valve 80, in accordance with the valve-element pressure after the engine is returned to a normal operating condition. The solenoid valve control apparatus of the present embodiment is effective in properly operating the solenoid valve with low power consumption and with reliable and smooth valve element operation.

In the above-described embodiment, the step 226 executed by the engine ECU 74 corresponds to the pressure detection means described in this application and to the cylinder pressure detection means described in this application. The step 230 executed by the engine ECU 74 corresponds to the electromagnetic force adjustment means described in this application. The step 228 executed by the engine ECU 74 corresponds to the port pressure detection means described in this application.

Further, in the above-described embodiment, the step 220 executed by the engine ECU 74 corresponds to the high-pressure condition detection means described in this application. The step 222 executed by the engine ECU 74 corresponds to the electromagnetic force adjustment means described in this application.

In the above-described embodiment, the exhaust port pressure is taken into consideration in determining the waveform of the exciting current. However, the present invention is not limited to this embodiment. As the exhaust port pressure does not exhibit a large change such as in the engine cylinder pressure, the consideration of the exhaust port pressure on the waveform of the exciting current is not always required.

In the above-described embodiment, the exhaust port pressure is directly detected based on the output signal of the exhaust port pressure sensor 64. However, the method of detecting the exhaust port pressure is not limited to this embodiment. For example, the exhaust port pressure may be indirectly detected based on the engine speed (NE) and the internal pressure of the serge tank 20.

Further, in the above-described embodiment, the exciting current, at the time of the exhaust valve open request, is adjusted based on the engine cylinder pressure and others. However, the present invention is not limited to this embodiment. The adjustment of the exciting current may be carried out at the time of the exhaust valve close request or at the time of the intake valve open request or close request, in addition to the time of the exhaust valve open request.

Next, a description will be provided of a fifth preferred embodiment of the solenoid valve control apparatus of the invention with reference to FIG. 1 through FIG. 3 and FIG. 19 through FIG. 21. In the present embodiment, the engine ECU 74 executes a control process shown in FIG. 19 in the internal combustion engine shown in FIG. 1. In the fourth preferred embodiment previously described, the engine cylinder pressure is directly detected by using the cylinder pressure sensor 54. In the present embodiment, the engine cylinder pressure is indirectly detected from a throttle position (TA) sensed by the throttle sensor 24.

Figure 19:
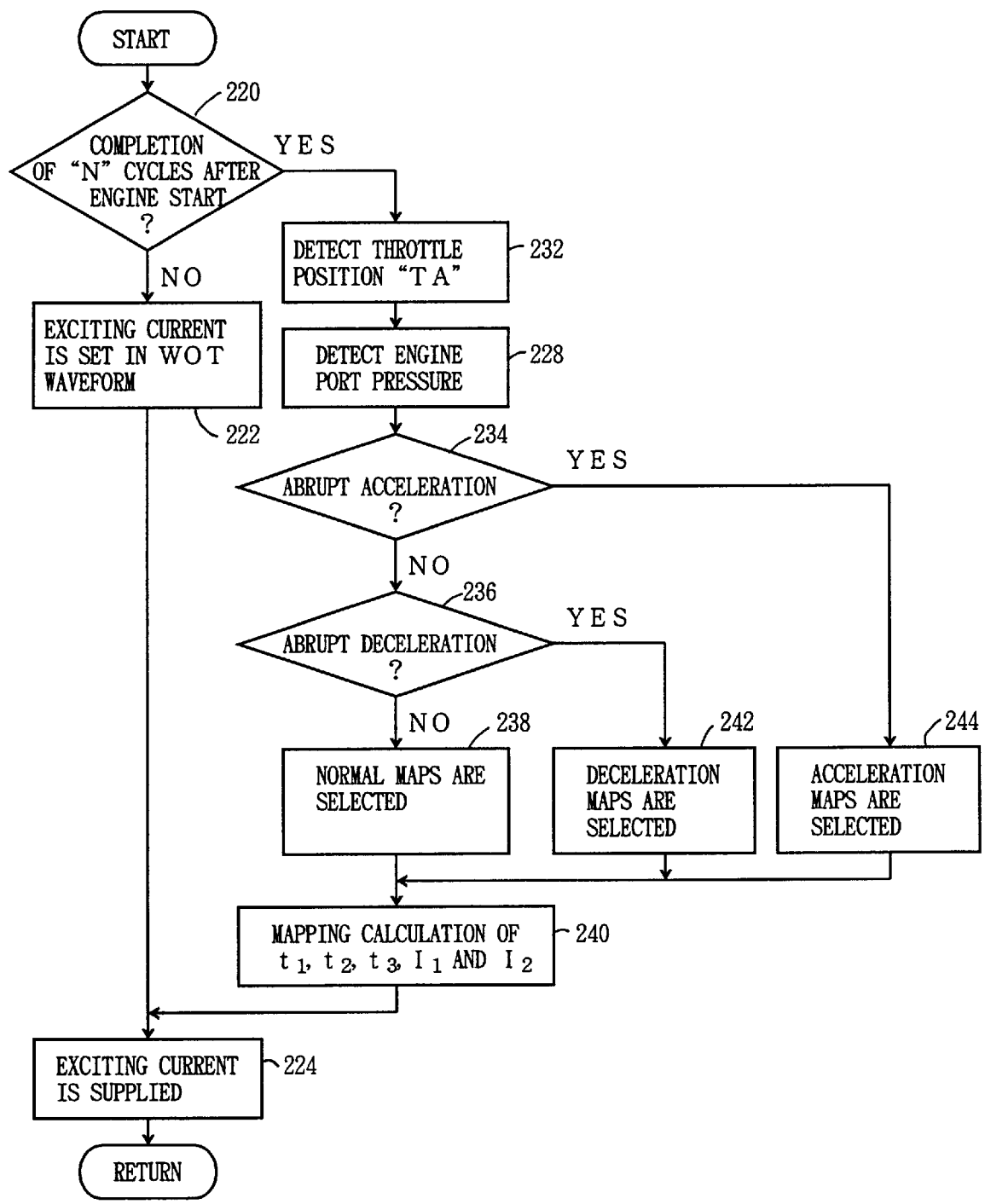
FIG. 19 is a flowchart for explaining a control process executed by a fifth preferred embodiment of the solenoid valve control apparatus of the invention.

FIG. 19 shows a control process executed by the engine ECU 74 of the fifth preferred embodiment of the solenoid valve control apparatus. The execution of the control process shown in FIG. 19 is repeatedly initiated each time the exhaust valve open request with respect to the exhaust valve 60 takes place. In FIG. 19, the steps which are essentially the same as corresponding steps in FIG. 16 are designated by the same reference numerals, and a description thereof will be omitted.

At a start of the control process, the engine ECU 74 executes step 220 in the flowchart of FIG. 19. In the step 220, it is determined whether the "N" cycles of the operations on the internal combustion engine are completed after a start of the engine operation. When the result at the step 220 is affirmative, the next step 232 is executed by the engine ECU 74.

Step 232 detects a throttle position "TA" of the throttle valve 22 based on the output signal of the throttle sensor 24. The amount of air that is proportional to the throttle position "TA" enters the internal combustion engine through the throttle valve 22. The engine cylinder pressure that is proportional to the throttle position "TA" is produced in the combustion chamber 44. By taking these matters into consideration, the engine ECU 74 in the present embodiment estimates the engine cylinder pressure based on the throttle position "TA" detected in the step 232.

After the step 232 is performed, the step 228 detects an engine port pressure based on the output signal of the exhaust port pressure sensor 64. After the step 228 is performed, the next step 234 is executed by the engine ECU 74.

Step 234 determines whether an abrupt acceleration of the engine is demanded, based on the throttle position "TA". Specifically, in the step 234, when a value of the derivative dTA/dt of the throttle position "TA" is larger than a threshold value, it is determined that the abrupt acceleration is demanded. When the result at the step 234 is negative, the next step 236 is executed by the engine ECU 74.

Step 236 determines whether an abrupt deceleration of the engine is demanded, based on the throttle position "TA". Specifically, in the step 236, when a value of the derivative dTA/dt of the throttle position "TA" is smaller than a negative threshold value, it is determined that the abrupt deceleration is demanded. When the result at the step 236 is negative, it is determined that the engine is operating in a normal running condition. The next step 238 is executed by the engine ECU 74.

Step 238 selects normal maps that are provided to determine the waveform of the exciting current (supplied to the lower coil 100 of the solenoid valve 80) when the engine is operating in a normal running condition.

Figure 20:
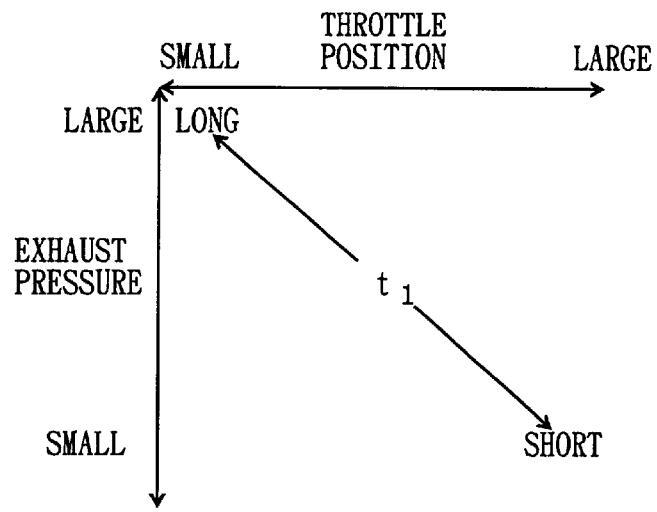
FIG. 20 is a diagram for explaining a map used by the fifth preferred embodiment of the solenoid valve control apparatus.

FIG. 20 shows a normal map of the off period "t1" stored in the engine ECU 74. In the above step 238, the normal map shown in FIG. 20 is selected as the map of the off period "t1". In the map shown in FIG. 20, the off period "t1" becomes shorter as the throttle position becomes larger and the exhaust port pressure becomes smaller.

Figure 21:
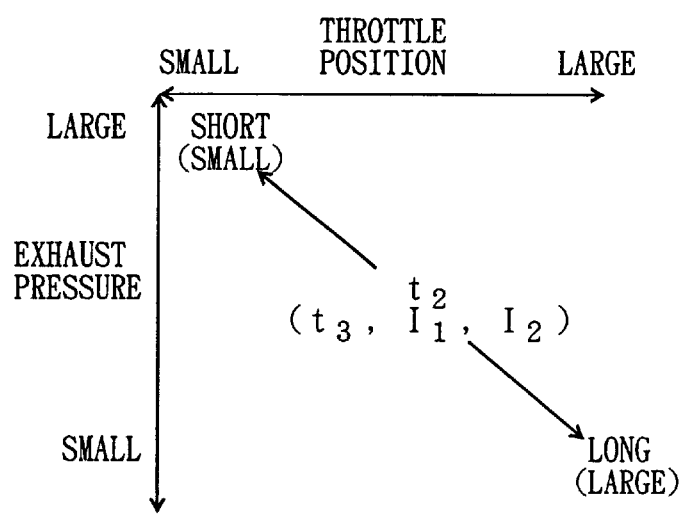
FIG. 21 is a diagram for explaining another map used by the fifth preferred embodiment of the solenoid valve control apparatus.

FIG. 21 shows a normal map of the attraction period "t2" stored in the engine ECU 74. In the engine ECU 74, a normal map of the reduction period "t3", a normal map of the attraction current "I1", and a normal map of the retained current "I2", which are similar to the normal map shown in FIG. 21, are stored. In the above step 238, these normal maps are selected. In these maps, the attraction period "t2", the reduction period "t3", the attraction current "I1" and the retained current "I2" become longer or larger as the throttle position becomes larger and the exhaust port pressure becomes smaller.

Step 240 calculates the time values "t1", "t2" and "t3" and the current values "I1" and "I2" based on the throttle position "TA" and the exhaust port pressure by using the selected maps. After the step 240 is performed, the step 224 is executed by the engine ECU 74.

Step 224 supplies the exciting current, which has been set in the appropriate waveform at the present cycle of the control process, to the lower coil 100 of the solenoid valve 80. After the step 224 is performed, the present cycle of the control process is terminated.

In the above-described control process, when the engine is operating in the normal running condition, the adjustment of the exciting current is carried out based on the throttle position TA and the engine port pressure. The solenoid valve control apparatus of the present embodiment is effective in providing low power consumption and a reliable, smooth valve element operation when the engine is operating in the normal running condition.

When the result at the step 236 is affirmative, it is determined that the abrupt deceleration of the engine is demanded. The engine ECU 74 in this case executes the next step 242. When the result at the step 234 is affirmative, it is determined that the abrupt acceleration of the engine is demanded. The engine ECU 74 in this case executes the next step 244.

Step 242 selects deceleration maps that are provided to determine the waveform of the exciting current when an abrupt deceleration of the engine is demanded.

Step 244 selects acceleration maps that are provided to determine the waveform of the exciting current when an abrupt acceleration of the engine is demanded.

After the step 242 or the step 244 is performed, the steps 240 and 224 are executed by the engine ECU 74. After this, the present cycle of the control process is terminated.

As described above, in the present embodiment, the engine cylinder pressure acting on the valve element of the exhaust valve 60 is indirectly detected from the throttle position TA sensed by the throttle sensor 24. The throttle position TA can be correlated to the engine cylinder pressure with good accuracy when the engine is operating in a normal running condition. However, when an abrupt acceleration or an abrupt deceleration of the engine is demanded, a change of the amount of the intake air to the engine will be delayed from a change of the throttle position TA. In such a transient condition, there will be a deviation between the throttle position TA and the engine cylinder pressure.

In the present embodiment, the acceleration maps, selected in the step 244, are configured such that the normal maps are compensated for a delay of the increase of the amount of the intake air to the engine, and the values of the exciting current are decreased from those of the normal maps. The deceleration maps, selected in the step 242, are configured such that the normal maps are compensated for a delay of the decrease of the amount of the increased from those of the normal maps.

In the present embodiment, when the engine is operating in the transient condition, the acceleration maps or the deceleration maps are selected to determine the waveform of the exciting current. Accordingly, the solenoid valve control apparatus of the present embodiment is effective in providing low power consumption and a reliable, smooth valve element operation even when the engine is operating in the transient condition.

In the above-described embodiment, the step 232 executed by the engine ECU 74 corresponds to the pressure detection means described in this application. The step 240 executed by the engine ECU 74 corresponds to the electromagnetic force adjustment means described in this application.

Further, in the above-described embodiment, the step 232 executed by the engine ECU 74 corresponds to the load detection means described in this application. The step 228 executed by the engine ECU 74 corresponds to the port pressure detection means described in this application.

Further, in the above-described embodiment, the steps 234 and 236 executed by the engine ECU 74 corresponds to the transient-condition detection means described in this application. The steps 242, 244 and 240 executed by the engine ECU 74 correspond to the electromagnetic force adjustment means described in this application.

In the above-described embodiment, when the acceleration or deceleration of the engine is demanded, the acceleration maps or the deceleration maps which are different from the normal maps are used to determine the waveform of the exciting current for the purpose of an improved accuracy of the solenoid valve control. However, the present invention is not limited to this embodiment. Alternatively, the waveform of the exciting current may be set to a predetermined waveform when the acceleration or deceleration of the engine is demanded.

In the above-described embodiment, the exhaust port pressure is taken into consideration in determining the waveform of the exciting current. However, the present invention is not limited to this embodiment. Alternatively, the waveform of the exciting current may be determined without considering the exhaust port pressure.

In the above-described embodiment, the exhaust port pressure is directly detected by using the exhaust port pressure sensor. Alternatively, the exhaust port pressure may be indirectly detected based on the engine speed (NE), the intake pipe pressure (PM) or the like.

Further, in the above-described embodiment, the exciting current, at the time of the exhaust valve open request, is adjusted based on the engine cylinder pressure and others. However, the present invention is not limited to this embodiment. The adjustment of the exciting current may be carried out at the time of the exhaust valve close request or at the time of the intake valve open request or close request, in addition to the time of the exhaust valve open request.

Next, a description will be provided of a sixth preferred embodiment of the solenoid valve control apparatus of the invention with reference to FIG. 1 through FIG. 3 and FIG. 22 through FIG. 24. In the present embodiment, the engine ECU 74 executes a control process shown in FIG. 22 in the internal combustion engine shown in FIG. 1. In the fifth preferred embodiment previously described, the engine cylinder pressure is indirectly detected by using the throttle position TA. In the present embodiment, the engine cylinder pressure is indirectly detected from an intake pipe pressure (PM) sensed by the intake pressure sensor 27.

Figure 22:
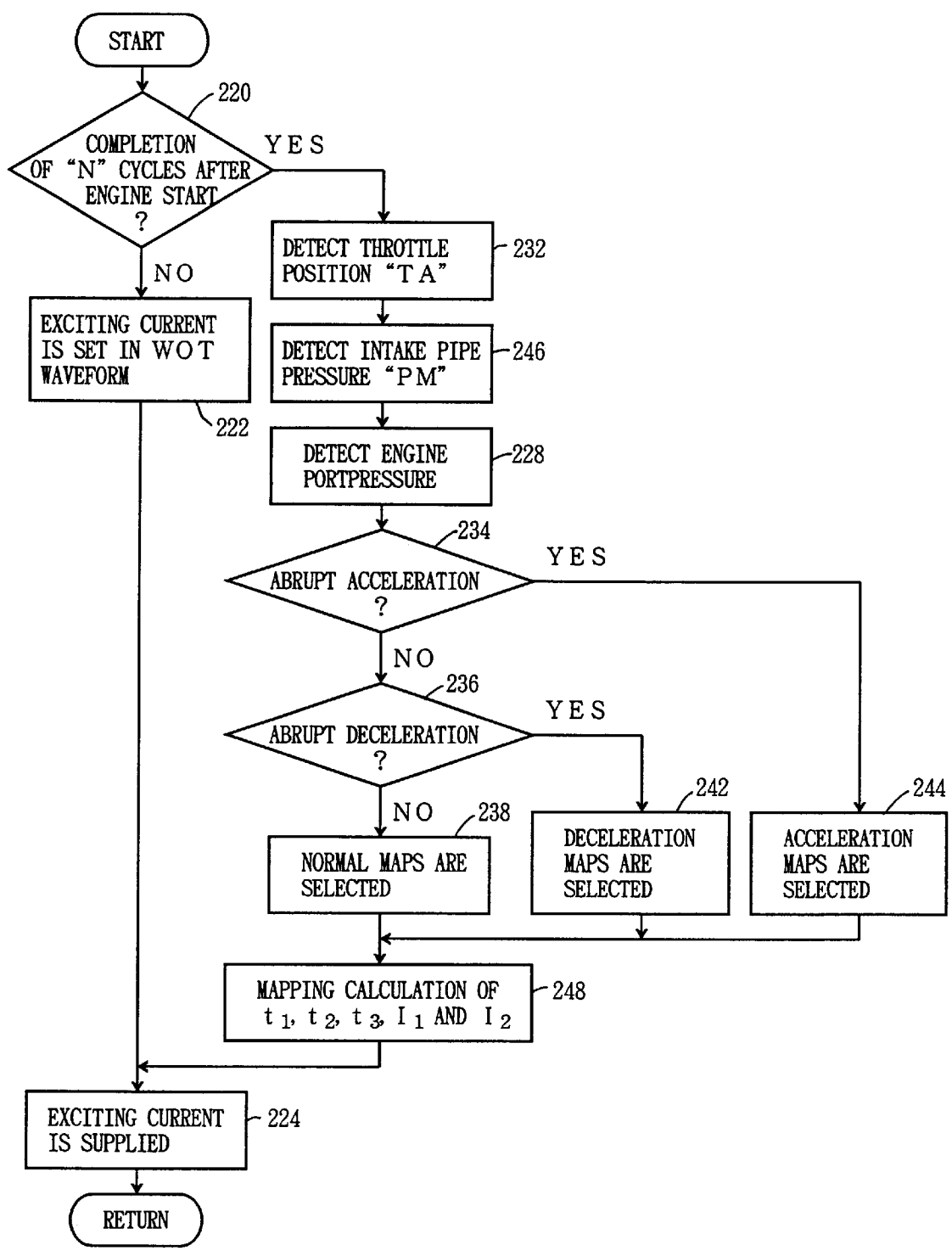
FIG. 22 is a flowchart for explaining a control process executed by a sixth preferred embodiment of the solenoid valve control apparatus of the invention.

FIG. 22 shows a control process executed by the engine ECU 74 of the sixth preferred embodiment of the solenoid valve control apparatus. The execution of the control process shown in FIG. 22 is repeatedly initiated each time the exhaust valve open request with respect to the exhaust valve 60 takes place. In FIG. 22, the steps which are essentially the same as corresponding steps in FIG. 19 are designated by the same reference numerals, and a description thereof will be omitted.

At a start of the control process, the engine ECU 74 executes step 220 in the flowchart of FIG. 22. In the step 220, it is determined whether the "N" cycles of the operations on the internal combustion engine are completed after a start of the engine operation. When the result at the step 220 is affirmative, the next step 232 is executed by the engine ECU 74.

Step 232 detects a throttle position "TA" of the throttle valve 22 based on the output signal of the throttle sensor 24. In the routine of FIG. 19, after the step 232 is performed, the next step 246 is executed.

Step 246 detects an intake pipe pressure "PM" based on the output signal of the intake pressure sensor 27. The engine cylinder pressure that is proportional to the intake pipe pressure "PM" is produced in the combustion chamber 44. By taking the matter into consideration, the engine ECU 74 in the present embodiment estimates the engine cylinder pressure based on the intake pipe pressure "PM" detected in the step 246.

After the step 246 is performed, the step 228 detects an engine port pressure based on the output signal of the exhaust port pressure sensor 64. After the step 228 is performed, the step 234 determines whether an abrupt acceleration of the engine is demanded, based on the throttle position "TA". When the result at the step 234 is negative, the step 236 determines whether an abrupt deceleration of the engine is demanded, based on the throttle position "TA". When the result at the step 236 is negative, it is determined that the engine is operating in a normal running condition. The step 238 selects the normal maps that are provided to determine the waveform of the exciting current when the engine is operating in a normal running condition.

When the result at the step 236 is affirmative, it is determined that the abrupt deceleration of the engine is demanded. The step 242 selects the deceleration maps that are provided to determine the waveform of the exciting current when an abrupt deceleration of the engine is demanded.

When the result at the step 234 is affirmative, it is determined that the abrupt acceleration of the engine is demanded. The step 244 selects the acceleration maps that are provided to determine the waveform of the exciting current when an abrupt acceleration of the engine is demanded.

Figure 23:
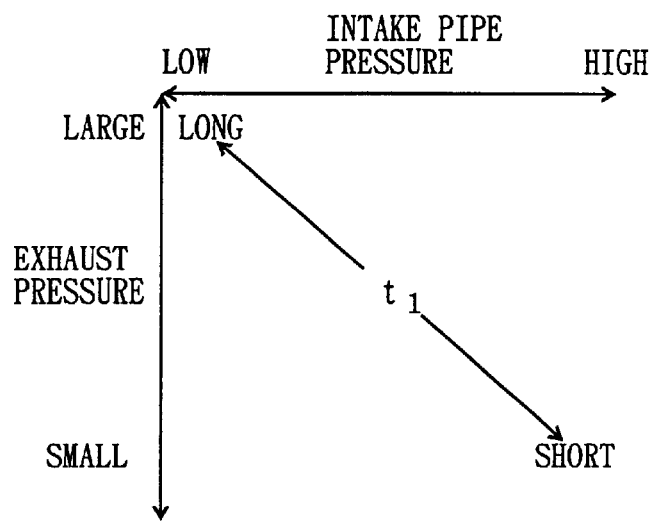
FIG. 23 is a diagram for explaining a map used by the sixth preferred embodiment of the solenoid valve control apparatus.

FIG. 23 shows a normal map of the off period "t1" stored in the engine ECU 74. In the above step 238, the normal map shown in FIG. 23 is selected as the map of the off period "t1". In the map shown in FIG. 23, the off period "t1" becomes shorter as the intake pipe pressure becomes higher and the exhaust port pressure becomes smaller.

Figure 24:
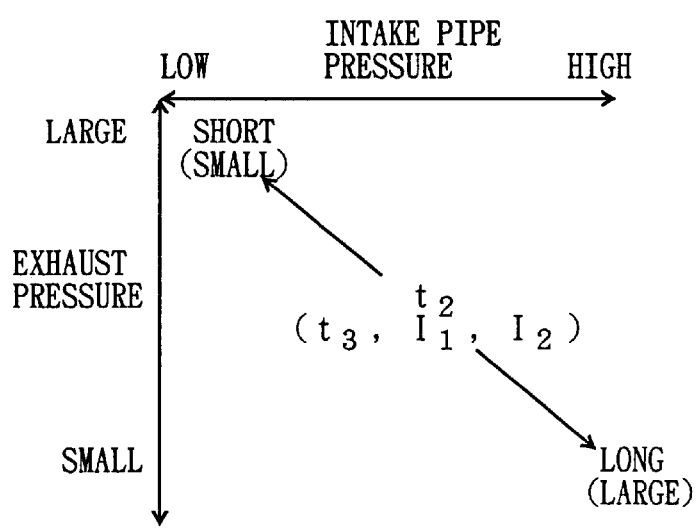
FIG. 24 is a diagram for explaining another map used by the sixth preferred embodiment of the solenoid valve control apparatus.

FIG. 24 shows a normal map of the attraction period "t2" stored in the engine ECU 74. In the engine ECU 74, a normal map of the reduction period "t3", a normal map of the attraction current "I1", and a normal map of the retained current "I2", which are similar to the normal map shown in FIG. 24, are stored. In the above step 238, these normal maps are selected. In these maps, the attraction period "t2", the reduction period "t3", the attraction current "I1" and the retained current "I2" become longer or larger as the intake pipe pressure becomes higher and the exhaust port pressure becomes smaller.

In the present embodiment, the acceleration maps, selected in the step 244, are configured such that the normal maps are compensated for a delay of the increase of the pressure of the intake air to the engine, and the values of the exciting current are decreased from those of the normal maps. The deceleration maps, selected in the step 242, are configured such that the normal maps are compensated for a delay of the decrease of the amount of the intake air to the engine, and the values of the exciting current are increased from those of the normal maps.

After one of the steps 238, 242 and 244 is performed, the step 248 calculates the time values "t1", "t2" and "t3" and the current values "I1" and "I2" based on the intake pipe pressure "PM" and the exhaust port pressure by using the selected maps. After the step 248 is performed, the step 224 supplies the exciting current, which has been set in the appropriate waveform at the present cycle of the control process, to the lower coil 100 of the solenoid valve 80. After the step 224 is performed, the present cycle of the control process is terminated.

In the present embodiment, when the engine is operating in the transient condition, the acceleration maps or the deceleration maps are selected to determine the waveform of the exciting current. Accordingly, the solenoid valve control apparatus of the present embodiment is effective in providing low power consumption and a reliable, smooth valve element operation, regardless of whether the engine is operating in a normal running condition or in the transient condition.

In the above-described embodiment, the step 232 executed by the engine ECU 74 corresponds to the pressure detection means described in this application. The step 248 executed by the engine ECU 74 corresponds to the electromagnetic force adjustment means described in this application.

Further, in the above-described embodiment, the step 246 executed by the engine ECU 74 corresponds to the load detection means described in this application. The step 228 executed by the engine ECU 74 corresponds to the port pressure detection means described in this application.

Further, in the above-described embodiment, the steps 234 and 236 executed by the engine ECU 74 corresponds to the transient-condition detection means described in this application. The steps 242, 244 and 248 executed by the engine ECU 74 correspond to the electromagnetic force adjustment means described in this application.

In the above-described embodiment, when the acceleration or deceleration of the engine is demanded, the acceleration maps or the deceleration maps which are different from the normal maps are used to determine the waveform of the exciting current for the purpose of an improved accuracy of the solenoid valve control. However, the present invention is not limited to this embodiment. Alternatively, the waveform of the exciting current may be set to a predetermined waveform when the acceleration or deceleration of the engine is demanded.

In the above-described embodiment, the exhaust port pressure is taken into consideration in determining the waveform of the exciting current. However, the present invention is not limited to this embodiment. Alternatively, the waveform of the exciting current may be determined without considering the exhaust port pressure.

In the above-described embodiment, the exhaust port pressure is directly detected by using the exhaust port pressure sensor. Alternatively, the exhaust port pressure may be indirectly detected based on the engine speed (NE), the intake pipe pressure (PM) or the like.

Further, in the above-described embodiment, the exciting current, at the time of the exhaust valve open request, is adjusted based on the engine cylinder pressure and others. However, the present invention is not limited to this embodiment. The adjustment of the exciting current may be carried out at the time of the exhaust valve close request or at the time of the intake valve open request or close request, in addition to the time of the exhaust valve open request.

Further, in the above-described embodiment, the engine cylinder pressure is indirectly detected based on the intake pipe pressure (PM). The present invention is not limited to this embodiment. When the engine is provided with an air flow meter that senses a flow rate of the intake air, the engine cylinder pressure is indirectly detected based on the flow rate of the intake air sensed by the air flow meter, rather than the intake pipe pressure (PM).

Further, the present invention is not limited to the above-described embodiments, and variations and modifications may be made without departing from the scope of the present invention.

What is claimed is:

1. A solenoid valve control apparatus for controlling a solenoid valve, the solenoid valve displacing a valve element between a valve-open position and a valve-closed position by a cooperation of a resilient force of an elastic member and an electromagnetic force of a solenoid coil, comprising:

strain detection means for detecting an amount of strain of the elastic member when a predetermined period has elapsed after a start of the displacement of the valve member from one of the valve-open position and the valve-closed position to the other position; and electromagnetic force adjustment means for adjusting, when the valve element is displaced from one of the valve-open position and the valve-closed position to the other position, the magnitude of the electromagnetic force to displace the valve element to the other position, to a controlled value based on the amount of strain of the elastic member detected by the strain detection means.

2. A solenoid valve control apparatus for controlling a solenoid valve, the solenoid valve displacing a valve element between a valve-open position and a valve-closed position by a cooperation of a resilient force of an elastic member and an electromagnetic force of a solenoid coil, comprising:

length detection means for detecting a whole length of the elastic member when a predetermined period has elapsed after a start of the displacement of the valve member from one of the valve-open position and the valve-closed position to the other position; and electromagnetic force adjustment means for adjusting, when the valve element is displaced from one of the valve-open position and the valve-closed position to the other position, the magnitude of the electromagnetic force to displace the valve element to the other position, to a controlled value based on the whole length of the elastic member detected by the length detection means.

3. A solenoid valve control apparatus for controlling a solenoid valve, the solenoid valve displacing a valve element between a valve-open position and a valve-closed position by a cooperation of a resilient force of an elastic member and an electromagnetic force of a solenoid coil, comprising:

load detection means for detecting a load of an internal combustion engine;

transient-condition detection means for detecting a transient condition of the engine in which a transient change of the engine load occurs; and electromagnetic force adjustment means for adjusting, when the valve element is displaced from one of the valve-open position and the valve-closed position to the other position, the magnitude of the electromagnetic force to displace the valve element to the other position, to a controlled value based on the load of the engine detected by the load detection means, and when the transient condition of the engine is detected by the transient-condition detection means, the electromagnetic force adjustment means adjusting the magnitude of the electromagnetic force to a controlled value which compensates for the change of the engine load.

4. The solenoid valve control apparatus according to claim 3, further comprising port pressure detection means for detecting a port pressure of the engine, in order to detect a pressure of the valve element based on the engine load and the engine port pressure.

* * * * *